US012634919B2

(12) United States Patent
Gao et al.

(10) Patent No.: US 12,634,919 B2
(45) Date of Patent: May 19, 2026

(54) RESOURCE SCHEDULING METHOD, COMMUNICATION APPARATUS, AND TERMINAL DEVICE

(71) Applicant: HUAWEI TECHNOLOGIES CO., LTD., Shenzhen (CN)

(72) Inventors: Lei Gao, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 18/374,280

(22) Filed: Sep. 28, 2023

(65) Prior Publication Data

US 2024/0032015 A1     Jan. 25, 2024

Related U.S. Application Data

(63) Continuation of application No. PCT/CN2021/084737, filed on Mar. 31, 2021.

(51) Int. Cl.
H04W 72/12 (2023.01)

(52) U.S. Cl.
CPC ................................... H04W 72/12 (2013.01)

(58) Field of Classification Search
CPC .................................................... H04W 72/12

USPC ......................................................... 370/329
See application file for complete search history.

(56) References Cited

U.S. PATENT DOCUMENTS

2017/0230959 A1     8/2017   Wu et al.

FOREIGN PATENT DOCUMENTS

| CA | 3063242 A1 * | 12/2018 | ........... H04L 5/0048 |
| CN | 110476385 A | 11/2019 | |
| CN | 111586623 A | 8/2020 | |
| WO | 2018228522 A1 | 12/2018 | |

* cited by examiner

*Primary Examiner* — Angel T Brockman
(74) *Attorney, Agent, or Firm* — WOMBLE BOND DICKINSON (US) LLP

(57) ABSTRACT

This application provides a resource scheduling method, a communication apparatus, and a terminal device, and may be applied to the field of short-range communication. According to the method, a second node sends a first message to a first node, where the first message includes a first indication, the first indication indicates configuration information of a first resource, and the first resource is for communication of system control information and/or a system control signal. The second node communicates first data with the first node by using a second resource, where the second resource does not overlap the first resource.

20 Claims, 9 Drawing Sheets

Terminal
device 1

Terminal
device 2

Network
device

Terminal
device

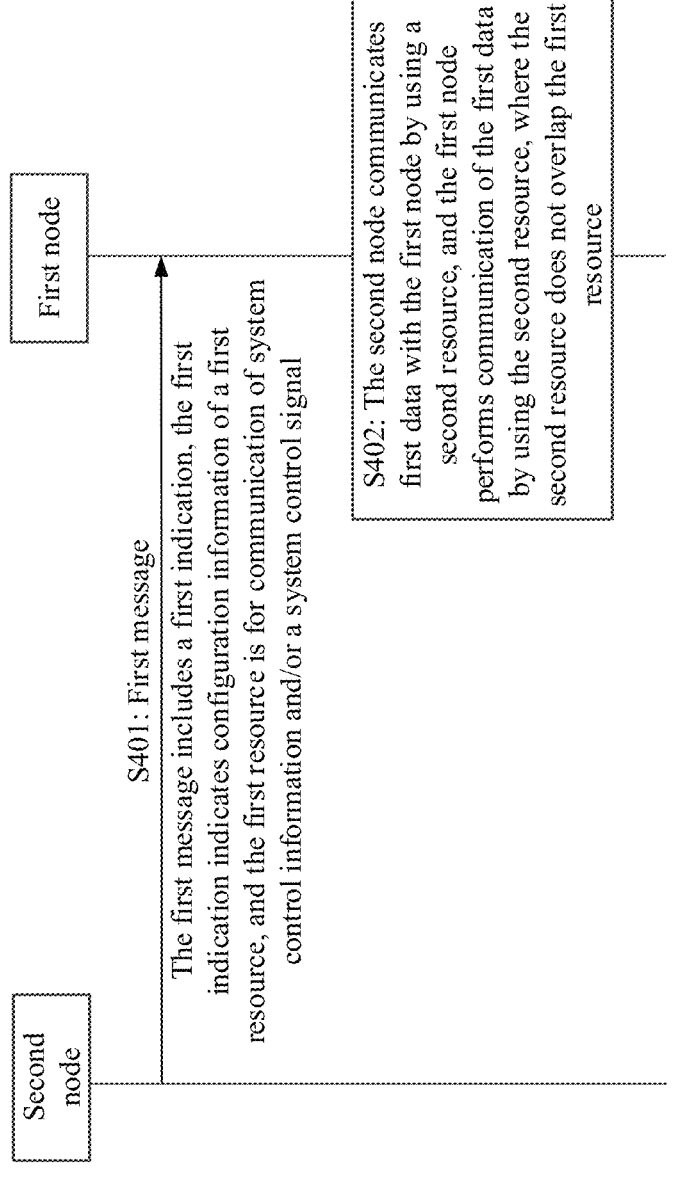

Second node

First node

S401: First message

The first message includes a first indication, the first indication indicates configuration information of a first resource, and the first resource is for communication of system control information and/or a system control signal S402: The second node communicates first data with the first node by using a second resource, and the first node performs communication of the first data by using the second resource, where the second resource does not overlap the first resource

FIG. 4

One radio frame includes one time domain symbol of a first overlapping resource

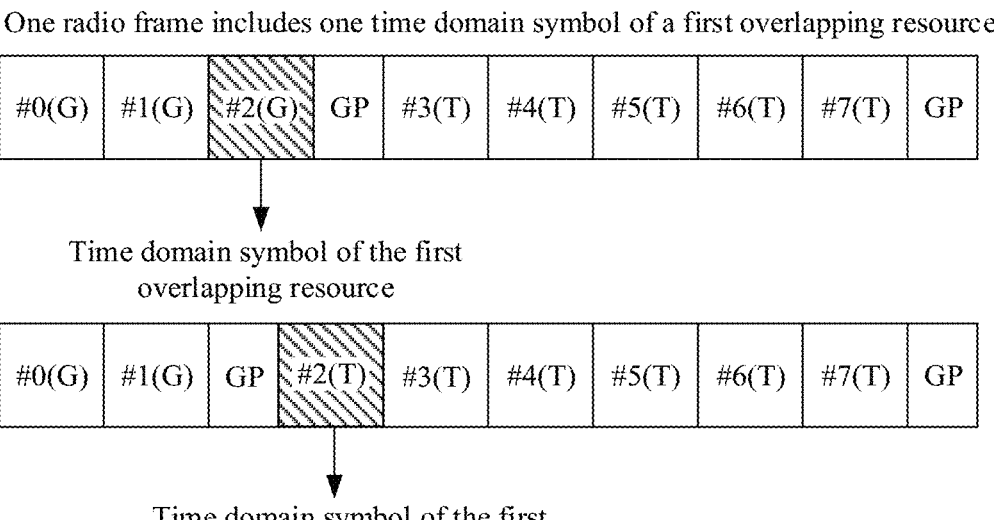

Time domain symbol of the first
overlapping resource

Time domain symbol of the first
overlapping resource

One radio frame includes two time domain symbols of the first overlapping resource

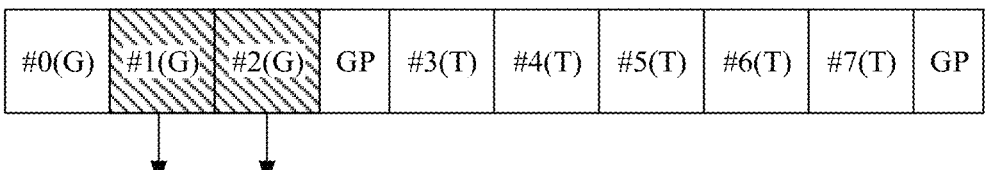

Time domain symbol of the first
overlapping resource

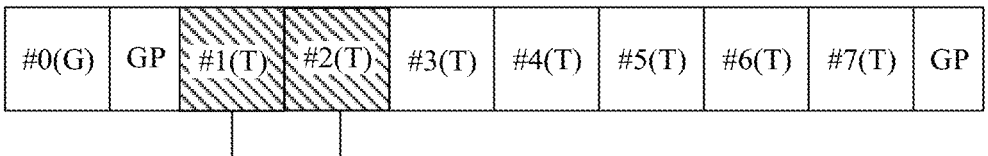

Time domain symbol of the first
overlapping resource

FIG. 5

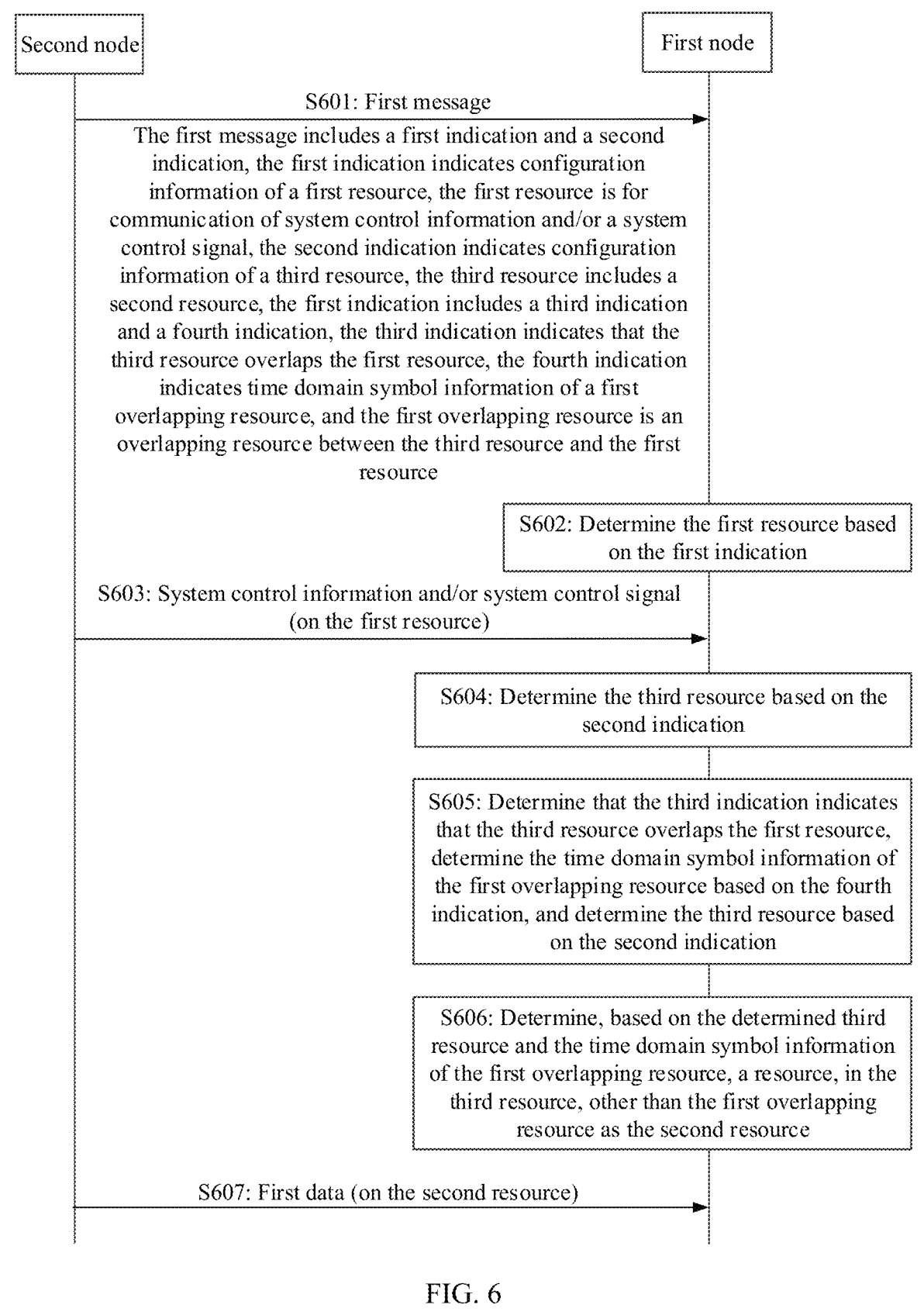

Second node                                                                    First node S601: First message The first message includes a first indication and a second
indication, the first indication indicates configuration
information of a first resource, the first resource is for
communication of system control information and/or a system
control signal, the second indication indicates configuration
information of a third resource, the third resource includes a
second resource, the first indication includes a third indication
and a fourth indication, the third indication indicates that the
third resource overlaps the first resource, the fourth indication
indicates time domain symbol information of a first
overlapping resource, and the first overlapping resource is an
overlapping resource between the third resource and the first
resource S602: Determine the first resource based
on the first indication S603: System control information and/or system control signal
(on the first resource)

S604: Determine the third resource based on the
second indication

S605: Determine that the third indication indicates
that the third resource overlaps the first resource,
determine the time domain symbol information of
the first overlapping resource based on the fourth
indication, and determine the third resource based
on the second indication S606: Determine, based on the determined third
resource and the time domain symbol information
of the first overlapping resource, a resource, in the
third resource, other than the first overlapping
resource as the second resource S607: First data (on the second resource)

FIG. 6

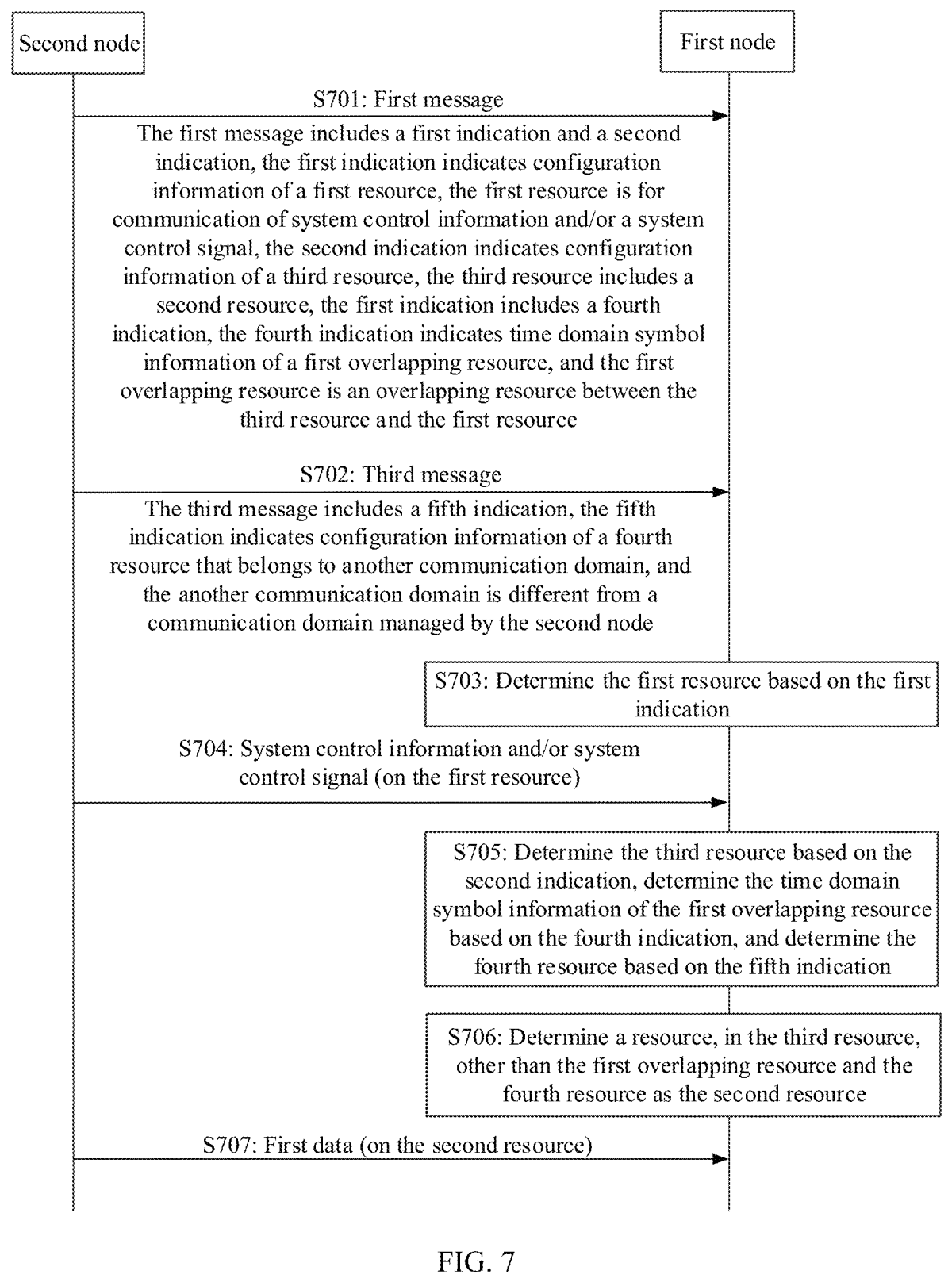

| Second node | | First node |
|---|---|---|

S701: First message
→

The first message includes a first indication and a second indication, the first indication indicates configuration information of a first resource, the first resource is for communication of system control information and/or a system control signal, the second indication indicates configuration information of a third resource, the third resource includes a second resource, the first indication includes a fourth indication, the fourth indication indicates time domain symbol information of a first overlapping resource, and the first overlapping resource is an overlapping resource between the third resource and the first resource

S702: Third message
→

The third message includes a fifth indication, the fifth indication indicates configuration information of a fourth resource that belongs to another communication domain, and the another communication domain is different from a communication domain managed by the second node

S703: Determine the first resource based on the first indication

S704: System control information and/or system control signal (on the first resource)
←

S705: Determine the third resource based on the second indication, determine the time domain symbol information of the first overlapping resource based on the fourth indication, and determine the fourth resource based on the fifth indication

S706: Determine a resource, in the third resource, other than the first overlapping resource and the fourth resource as the second resource

S707: First data (on the second resource)
←

FIG. 7

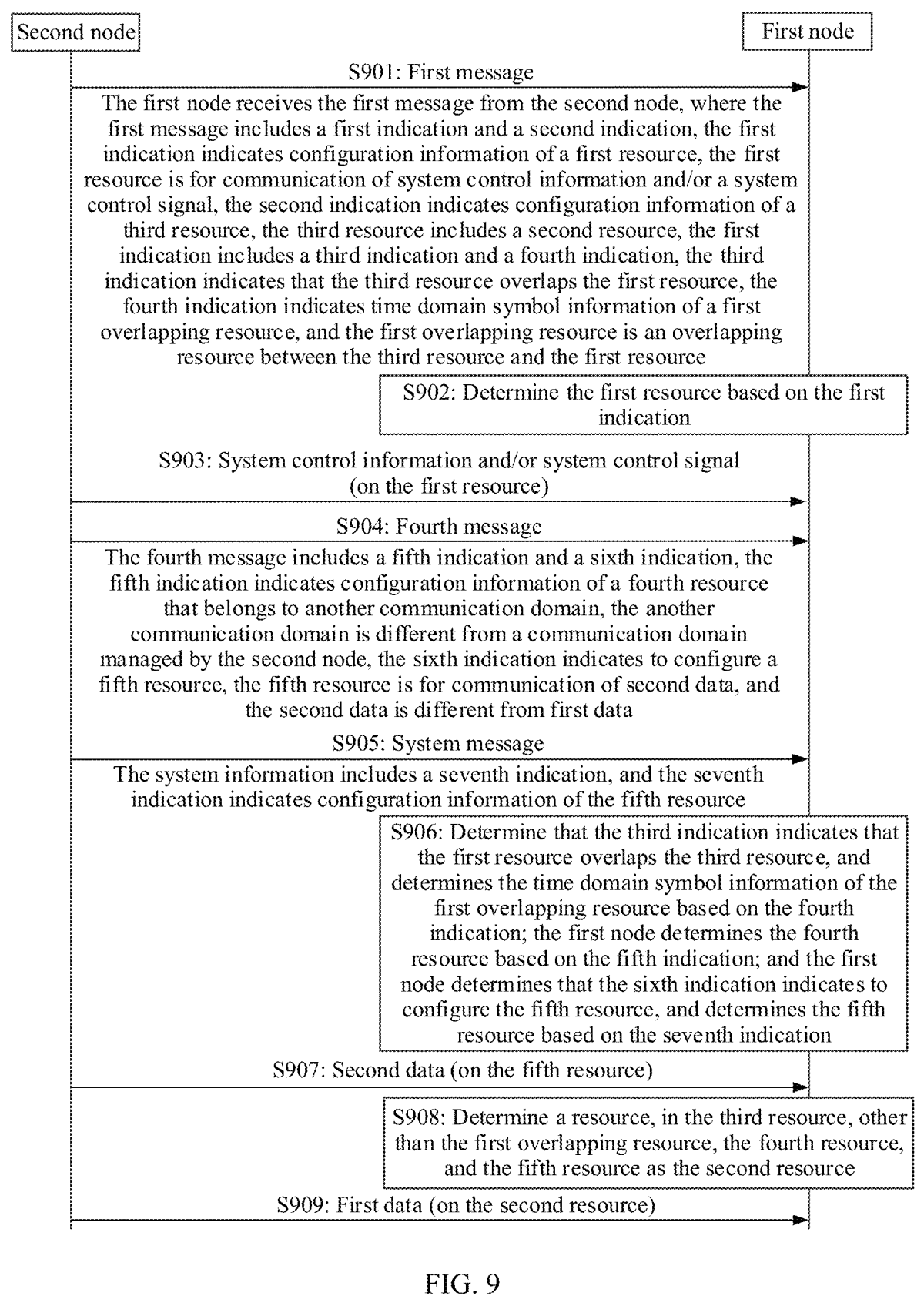

Second node | First node

S901: First message

The first node receives the first message from the second node, where the first message includes a first indication and a second indication, the first indication indicates configuration information of a first resource, the first resource is for communication of system control information and/or a system control signal, the second indication indicates configuration information of a third resource, the third resource includes a second resource, the first indication includes a third indication and a fourth indication, the third indication indicates that the third resource overlaps the first resource, the fourth indication indicates time domain symbol information of a first overlapping resource, and the first overlapping resource is an overlapping resource between the third resource and the first resource S902: Determine the first resource based on the first indication S903: System control information and/or system control signal (on the first resource)

S904: Fourth message

The fourth message includes a fifth indication and a sixth indication, the fifth indication indicates configuration information of a fourth resource that belongs to another communication domain, the another communication domain is different from a communication domain managed by the second node, the sixth indication indicates to configure a fifth resource, the fifth resource is for communication of second data, and the second data is different from first data S905: System message The system information includes a seventh indication, and the seventh indication indicates configuration information of the fifth resource S906: Determine that the third indication indicates that the first resource overlaps the third resource, and determines the time domain symbol information of the first overlapping resource based on the fourth indication; the first node determines the fourth resource based on the fifth indication; and the first node determines that the sixth indication indicates to configure the fifth resource, and determines the fifth resource based on the seventh indication S907: Second data (on the fifth resource)

S908: Determine a resource, in the third resource, other than the first overlapping resource, the fourth resource, and the fifth resource as the second resource S909: First data (on the second resource)

FIG. 9

RESOURCE SCHEDULING METHOD, COMMUNICATION APPARATUS, AND TERMINAL DEVICE

CROSS-REFERENCE TO RELATED APPLICATIONS

This application is a continuation of International Application No. PCT/CN2021/084737, filed on Mar. 31, 2021, the disclosure of which is hereby incorporated by reference in its entirety.

TECHNICAL FIELD

This application relates to the field of wireless communication technologies, specifically, to a resource scheduling method, a communication apparatus, and a terminal device, and in particular, to the field of short-range communication.

BACKGROUND

In wireless communication, there may be a plurality of communication domains in one area. The communication domain is a system that includes a group of communication nodes having a communication relationship and includes a communication link between the communication nodes. One communication domain may include one primary communication node (which may be briefly referred to as a primary node) and at least one secondary communication node (which may be briefly referred to as a secondary node). The primary node manages a time-frequency resource of the communication domain, and the primary node may schedule a time-frequency resource for the secondary node. The secondary node performs, based on scheduling of the primary node, data transmission by using the resource allocated by the primary node. However, in one communication domain, a plurality of types of service data and system control information may need to be transmitted, and different data transmission or information transmission may occupy a same time-frequency resource or different time-frequency resources. Therefore, a flexible resource scheduling manner is urgently required currently.

SUMMARY

Embodiments of this application provide a resource scheduling method, to reduce resource scheduling overheads and flexibly implement resource scheduling.

According to a first aspect, this application provides a resource scheduling method. The method includes: sending a first message to a first node, where the first message includes a first indication, the first indication indicates configuration information of a first resource, and the first resource is for communication of system control information and/or a system control signal; and communicating first data with the first node by using a second resource, where the second resource does not overlap the first resource.

In this method, the first indication may be sent to the first node through the first message, to indicate the configuration information of the first resource, and therefore indicate the resource for communication of the system control information and/or the system control signal, and the first data may be communicated with the first node by using the second resource that is different from the first resource. According to this solution, a flexible resource scheduling method is provided. The first indication is sent to the first node through the first message, to reduce resource scheduling overheads.

In addition, the first message is directly sent to the first node, so that resource scheduling reliability is improved.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

According to an embodiment, the first message may further include the second indication used to indicate the configuration information of the third resource, to further reduce the resource scheduling overheads. In addition, the first indication may further include the third indication and/or the fourth indication, and can therefore indicate the overlapping resource between the first resource and the third resource, to avoid a conflict between a resource occupied by the system control information and/or the system control signal and a resource occupied by the first data.

In an embodiment, the method further includes: sending a second message, where the second message includes the fourth indication, and the second message is different from the first message.

According to an embodiment, the fourth indication may be sent through the second message, to indicate the time domain symbol information of the first overlapping resource that is the overlap between the third resource and the first resource, and therefore flexibly indicate the first overlapping resource.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

According to an embodiment, a plurality of indication manners of the time domain symbol of the first overlapping resource are provided. For example, the fourth indication may include the total quantity information of the time domain symbol of the first overlapping resource in the N time domain resource units. In this manner, a resource occupied by the fourth indication can be reduced, and the overheads can be reduced. Alternatively, the fourth indication includes the quantity information of the time domain symbol of the first overlapping resource in each of the N time domain resource units. In this manner, the quantity information of the time domain symbol of the first overlapping resource in each of the N time domain resource units can be accurately indicated, and resource scheduling reliability is improved. Alternatively, the fourth indication includes the at least one piece of first quantity information, and the quantity of at least one time domain resource unit corresponding to each piece of first quantity information in the N time domain resource units. In this manner, the quantity information of the time domain symbol of the first overlapping resource may be indicated in a simple manner, so that the resource occupied by the fourth indication is reduced while reliability is ensured.

In an embodiment, the method further includes: sending a fifth indication. The fifth indication indicates configuration information of a fourth resource that belongs to another communication domain. The another communication domain is different from a communication domain managed by a second node. The second node is a communication node sending the first message. The fifth indication is carried in the first message or a third message different from the first message.

In an embodiment, the fifth indication may be sent through the first message or the third message, to indicate the configuration information of the fourth resource that belongs to the another communication domain, and notify the first node of a resource that cannot be occupied in the communication domain, so that a resource conflict between the first node and the fourth resource in the another communication domain during data transmission is avoided, and data transmission security is improved.

In an embodiment, the method further includes: sending a sixth indication. The sixth indication indicates whether to configure a fifth resource. The fifth resource is for communication of second data. The second data is different from the first data. The sixth indication is carried in the first message or a fourth message different from the first message.

According to an embodiment, the sixth indication may be sent through the first message or the fourth message, to indicate whether the fifth resource is configured, and indicate whether a service corresponding to the second data exists in the communication domain. In this way, the indication of the fifth resource may be flexibly implemented based on a service status in the communication domain, and the resource scheduling overheads are reduced.

In an embodiment, the method further includes: sending system information. The system information includes a seventh indication. The seventh indication indicates configuration information of the fifth resource. The fifth resource is for communication of the second data. The second data is different from the first data.

According to an embodiment, the seventh indication may be sent through the system information, to indicate the configuration information of the fifth resource. A message used to indicate the configuration information of the fifth resource does not need to be separately sent, so that the overheads are further reduced.

In an embodiment, the method further includes: sending a fifth message at least P times in one periodicity. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

According to an embodiment, the fifth message may be sent P times in the one periodicity to send the seventh indication, and the fifth message may be sent a plurality of times to assist the second node in accurately receiving the seventh indication, so that resource scheduling reliability is improved. In addition, the fifth message is sent the plurality of times in the one periodicity including the M superframes, to reduce resource scheduling overheads by prolonging an update periodicity of the fifth resource.

In an embodiment, the method further includes: sending configuration information of a sixth resource or indication information indicating configuration information of a sixth resource. The sixth resource is for communication of the fifth message.

According to an embodiment, the configuration information of the sixth resource or the indication information of the configuration information of the sixth resource may be indicated, so that after receiving the configuration information of the sixth resource or the indication information of the configuration information of the sixth resource, the first node can determine to receive the fifth message on the sixth resource, and resource scheduling reliability is improved.

In an embodiment, the method further includes: sending the first quantity information or indication information of the first quantity information. The first quantity information indicates the quantity M of superframes included in the one periodicity.

According to an embodiment, the quantity M of superframes included in the one periodicity may be indicated, so that the second node that sends the fifth message and the first node that receives the fifth message determine the quantity M of superframes included in the one periodicity. The first node may perform accuracy checking based on the fifth message received P times in the one periodicity, so that reliability of communication of the fifth message is improved.

In an embodiment, the method further includes: sending second quantity information or indication information of second quantity information. The second quantity information indicates the quantity P of times of sending the fifth message in the one periodicity.

According to an embodiment, the quantity P of times of sending the fifth message in the one periodicity may be indicated, so that the first node that receives the fifth message determines the quantity P of times of sending the fifth message by the second node in the one periodicity. The first node may perform checking based on the fifth message received P times in the one periodicity, so that reliability of communication of the fifth message is improved.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

According to an embodiment, content included in the system control information and the system control signal may be classified and defined, so that the first node and the second node may perform communication of the system control information and/or the system control signal by using the first resource, to prevent a resource conflict between communication of different information or signals and communication of service data.

According to a second aspect, this application provides a resource scheduling method. The method includes:

receiving a first message from a second node, where the first message includes a first indication, the first indication indicates configuration information of a first resource, and the first resource is for communication of system control information and/or a system control signal; and performing communication of first data by using a second resource, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the method further includes: receiving a second message from the second node, where the second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, before the performing communication of first data by using a second resource, the method further includes: determining the second resource based on the first indication and the second indication.

In an embodiment, the method further includes: receiving a fifth indication from the second node. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the method further includes: receiving a sixth indication from the second node. The sixth indication indicates whether to configure a fifth resource. The fifth resource is for communication of second data. The second data is different from the first data. The sixth indication is carried in the first message or a fourth message different from the first message.

In an embodiment, the method further includes: receiving system information from the second node. The system information includes a seventh indication. The seventh indication indicates configuration information of the fifth resource. The fifth resource is for communication of the second data. The second data is different from the first data.

In an embodiment, the method further includes: receiving a fifth message at least P times in one periodicity. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the method further includes: receiving configuration information of a sixth resource or indication information indicating configuration information of a sixth resource from the second node. The sixth resource is for communication of the fifth message.

In an embodiment, the method further includes: receiving the first quantity information or indication information of the first quantity information from the second node. The first quantity information indicates the quantity M of superframes included in the one periodicity.

In an embodiment, the method further includes: receiving second quantity information or indication information of second quantity information from the second node. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

According to a third aspect, an embodiment of this application provides a communication apparatus, and the communication apparatus includes a processing module and a transceiver module.

The transceiver module is configured to perform sending and receiving operations.

The processing module is configured to: send a first message to a first node through the transceiver module, where the first message includes a first indication, the first indication indicates configuration information of a first resource, and the first resource is for communication of system control information and/or a system control signal; and communicate first data with the first node by using a second resource through the transceiver module, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processing module is further configured to send a second message through the transceiver module. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processing module is further configured to send a fifth indication through the transceiver module. The fifth indication indicates configuration information of a fourth resource that belongs to another communication domain. The another communication domain is different from a communication domain managed by a second node. The second node is a communication node sending the first message. The fifth indication is carried in the first message or a third message different from the first message.

In an embodiment, the processing module is further configured to send a sixth indication through the transceiver module. The sixth indication indicates whether to configure a fifth resource. The fifth resource is for communication of second data. The second data is different from the first data. The sixth indication is carried in the first message or a fourth message different from the first message.

In an embodiment, the processing module is further configured to send system information through the transceiver module. The system information includes a seventh indication. The seventh indication indicates configuration information of the fifth resource. The fifth resource is for communication of the second data. The second data is different from the first data.

In an embodiment, the processing module is further configured to send a fifth message at least P times in one periodicity through the transceiver module. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processing module is further configured to send, through the transceiver module, configuration information of a sixth resource or indication information indicating configuration information of a sixth resource. The sixth resource is for communication of the fifth message.

In an embodiment, the processing module is further configured to send, through the transceiver module, the first quantity information or indication information of the first quantity information. The first quantity information indicates the quantity M of superframes included in the one periodicity.

In an embodiment, the processing module is further configured to send, through the transceiver module, second quantity information or indication information of second quantity information. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

According to a fourth aspect, an embodiment of this application provides a communication apparatus, and the communication apparatus includes a processing module and a transceiver module.

The transceiver module is configured to perform sending and receiving operations.

The processing module is configured to: receive a first message from a second node through the transceiver module, where the first message includes a first indication, the first indication indicates configuration information of a first resource, and the first resource is for communication of system control information and/or a system control signal; and perform communication of first data by using a second resource through the transceiver module, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processing module is further configured to receive a second message from the second node through the transceiver module. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processing module is further configured to: before performing communication of the first data by using the second resource through the transceiver module, determine the second resource based on the first indication and the second indication.

In an embodiment, the processing module is further configured to receive a fifth indication from the second node through the transceiver module. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the processing module is further configured to receive a sixth indication from the second node through the transceiver module. The sixth indication indicates whether to configure a fifth resource. The fifth resource is for communication of second data. The second data is different from the first data. The sixth indication is carried in the first message or a fourth message different from the first message.

In an embodiment, the processing module is further configured to receive system information from the second node through the transceiver module. The system information includes a seventh indication. The seventh indication indicates configuration information of the fifth resource. The fifth resource is for communication of the second data. The second data is different from the first data.

In an embodiment, the processing module is further configured to receive a fifth message at least P times in one periodicity through the transceiver module. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processing module is further configured to receive, from the second node through the transceiver module, configuration information of a sixth resource or indication information indicating configuration information of a sixth resource. The sixth resource is for communication of the fifth message.

In an embodiment, the processing module is further configured to receive, from the second node through the transceiver module, first quantity information or indication information of first quantity information. The first quantity information indicates the quantity M of superframes included in the one periodicity.

In an embodiment, the processing module is further configured to receive, from the second node through the transceiver module, second quantity information or indication information of second quantity information. The second quantity information indicates the quantity P of times of sending the fifth message in the one periodicity.

In an embodiment, the system control information includes at least one of the following: acknowledgment/ negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

According to a fifth aspect, an embodiment of this application provides a communication apparatus, and the communication apparatus includes at least one processor. The at least one processor is coupled to at least one memory, and the at least one processor is configured to read a computer program stored in the at least one memory, to perform the method provided in the first aspect or the second aspect.

According to a sixth aspect, an embodiment of this application further provides a computer program. When the computer program runs on a computer, the computer is enabled to perform the method provided in any one of the foregoing aspects.

According to a seventh aspect, an embodiment of this application further provides a computer-readable storage medium. The computer-readable storage medium stores a computer program. When the computer program is executed by a computer, the computer is enabled to perform the method provided in any one of the foregoing aspects.

According to an eighth aspect, an embodiment of this application further provides a chip. The chip is configured to read a computer program stored in a memory, to perform the method provided in any one of the foregoing aspects.

According to a ninth aspect, an embodiment of this application further provides a chip system. The chip system includes a processor, and the processor is configured to support a computer apparatus in implementing the method provided in any one of the foregoing aspects. In an embodiment, the chip system further includes a memory. The memory is configured to store a program and data that are necessary for the computer apparatus. The chip system may include a chip, or may include a chip and another discrete device.

According to a tenth aspect, an embodiment of this application further provides a terminal device. The terminal device includes the communication apparatus provided in the third aspect or the fourth aspect, and the terminal device is any one of an intelligent manufacturing device, an intelligent transportation device, an intelligent wearable device, and a smart home device.

BRIEF DESCRIPTION OF DRAWINGS

FIG. 4 is a flowchart of a resource scheduling method according to an embodiment of this application;

FIG. 5 is a schematic diagram of a distribution rule of a time domain symbol of a first overlapping resource according to an embodiment of this application;

FIG. 6 is a flowchart of a first example according to an embodiment of this application;

FIG. 7 is a flowchart of a second example according to an embodiment of this application;

FIG. 9 is a flowchart of a fourth example according to an embodiment of this application;

DESCRIPTION OF EMBODIMENTS

Figure 1:
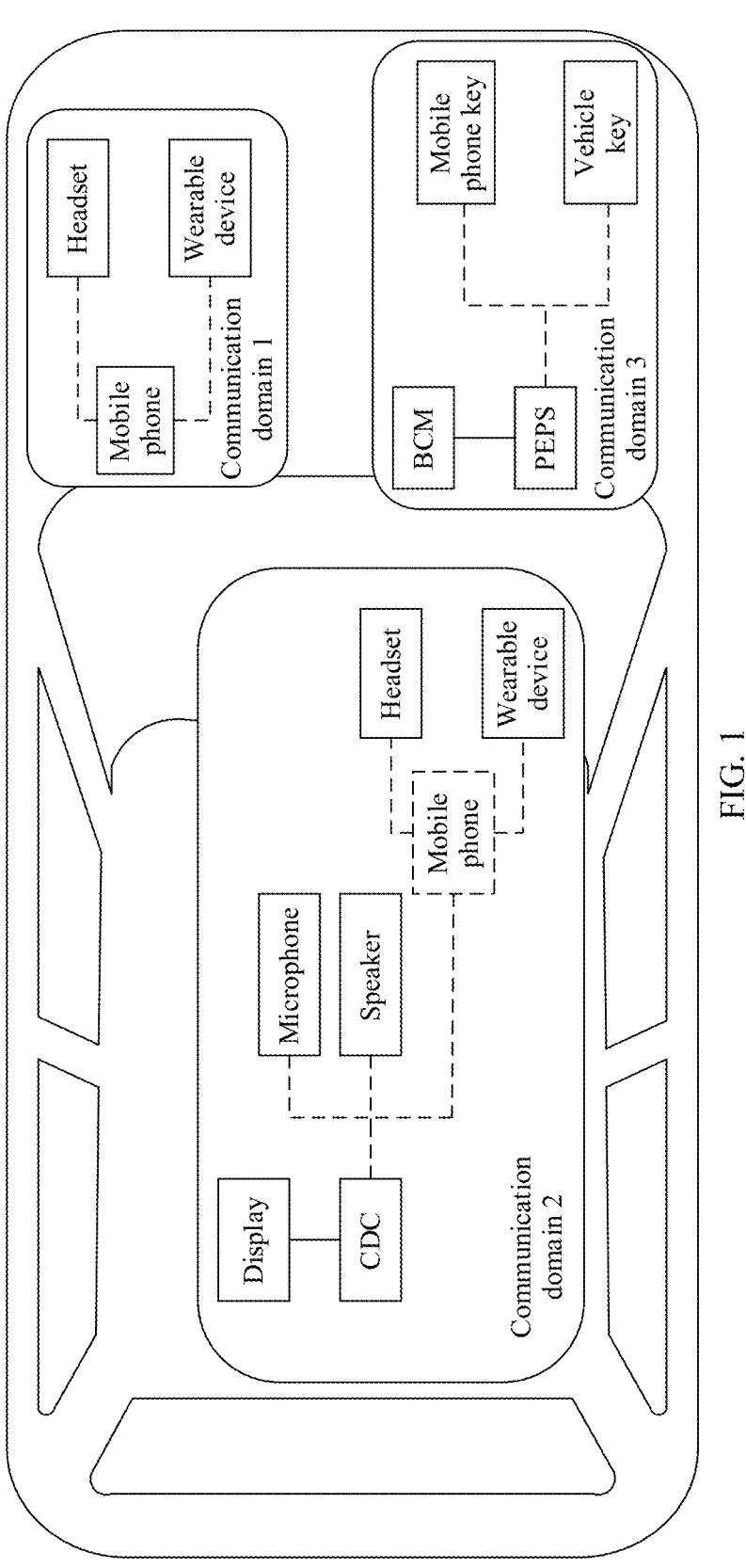
FIG. 1 is a schematic diagram of a topological relationship of vehicle-mounted communication links according to an embodiment of this application.

To facilitate understanding of embodiments of this application, the following describes terms related to embodiments of this application.

(1) Communication domain: The communication domain is a system that includes a group of communication nodes having a communication relationship and includes a communication connection relationship between the communication nodes. One communication domain includes at least one primary communication node (which may be briefly referred to as a primary node) and at least one secondary communication node (which may be briefly referred to as a secondary node). The primary node manages a time-frequency resource of the communication domain, and is responsible for allocating a resource to the secondary node. The secondary node performs, based on scheduling of the primary node, data transmission by using the resource allocated by the primary node.

The communication nodes may be various apparatuses or devices. For example, in a communication domain of a wide area wireless communication system, the primary node may be a base station, and the secondary node may be a terminal device. The base station may exchange data with the terminal device. The base station is responsible for managing a resource and allocating a resource to the terminal device. The terminal device may communicate with the base station by using the resource allocated by the base station. For another example, in a local area wireless communication system, the primary node may be an access point (AP), the secondary node may be a station, the access point may allocate a resource to the station, and the station may communicate with the access point on the resource allocated by the access point. For still another example, in a vehicle-mounted communication system, the primary node may be a cockpit domain controller, and the secondary node may be an apparatus such as a vehicle-mounted speaker or a vehicle-mounted microphone. The cockpit domain controller may allocate a resource to the apparatus such as the vehicle-mounted speaker or the vehicle-mounted microphone. The apparatus such as the vehicle-mounted speaker or the vehicle-mounted microphone may communicate with the cockpit domain controller by using the resource allocated by the cockpit domain controller.

(2) Cockpit domain controller (cockpit domain controller or control domain cockpit, CDC): The cockpit domain controller is CDC for short. Currently, in addition to conventional radio, music time-frequency playing, and navigation functions, the CDC already has a cellular communication function (3G, 4G, and the like), and can implement, in combination with a controller area net-work bus (controller area net-work bus, CAN-BUS) technology of a vehicle, information communication between a person and the vehicle, and between the vehicle and the outside, so that user experience and functions related to a service and security are enhanced.

(3) Transmission direction: The transmission directions include uplink and downlink, where uplink is a direction of sending a message or a signal from the secondary node to the primary node, and downlink is a direction of sending a message or a signal from the primary node to the secondary node. For a scenario in which differentiation is not required or confusion is not generated, uplink and downlink may also be collectively referred to as uplink/downlink. In solutions of this application, uplink and downlink are merely intended to facilitate descriptions of information flow directions.

(4) Message: The message is used to carry one or more pieces of information, or is used to carry one or more pieces of signaling. For example, one message may include a plurality of fields, and each field may be one piece of information or one piece of signaling.

Information: content included in the information can be obtained only after a receiving end node receives and decodes the information. For example, information in a wireless communication system includes service information, system information, control information, and the like. The control information may also be referred to as signaling. The system information is used to transfer a related parameter of a communication domain, or parameter configuration information or a common configuration parameter of a primary node in the communication domain. The system information is information that needs to be learned by a secondary node in the communication domain or a secondary node that requests to join the current communication domain. For example, configuration information of a resource pool may be the system information. For another example, a SIB and a MIB in a new radio (NR) system or a long term evolution (LTE) system may also be the system information. It may be understood that the system information may also be the control information.

Signaling: The signaling is the control information in the wireless communication system. At an access layer of the wireless communication system, the signaling may be classified into physical layer signaling and higher layer signaling. The physical layer signaling is the control information communicated at a physical layer, for example, common control signaling. The common control signaling is signaling that is sent by the primary node in the communication domain in a broadcast manner at the physical layer and that is used to send indication information to the secondary node in the communication domain managed by the primary node. The higher layer signaling is the control information communicated at another protocol layer that is at the access layer and that is other than the physical layer.

Signal: Before receiving the signal, the receiving end node in the wireless communication system may learn in advance a sequence corresponding to the signal. After receiving a signal related to the receiving end node, the receiving end node may perform processing corresponding to the signal.

It may be understood that in embodiments of this application, sending information may be understood as sending a message carrying the information. For example, sending system information by a second node may be understood as sending a message carrying the system information by the second node.

(5) Terminal device: The terminal device is also referred to as user equipment (UE), a mobile station (MS), a mobile terminal (MT), or the like, and is a device that provides voice and/or data connectivity for a user. For example, the terminal device includes a handheld device, a vehicle-mounted device, or the like that has a wireless connection function. Currently, the terminal device may be a mobile phone, a tablet computer, a notebook computer, a palmtop computer, a mobile internet device (MID), a wearable device, a virtual reality (virtual reality, VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city (smart city), a wireless terminal in a smart home, or the like.

The following further describes embodiments of this application with reference to the accompanying drawings.

A communication scenario in a vehicle is used as an example. Based on current and future technology evolution, vehicle-mounted applications tend to be diversified, and a quantity and types of communication nodes in the vehicle are increasing. This imposes a higher requirement on a capability of vehicle-mounted communication. Compared with existing wired communication, vehicle-mounted wireless communication can further reduce a quantity of wiring harnesses, a length of the wiring harness, and a weight of the wiring harness in the vehicle, and reduce corresponding installation costs, maintenance costs, or the like. This leads to a gradual trend towards wireless development in the vehicle-mounted communication.

FIG. 1 is a schematic diagram of a topology relationship of a vehicle-mounted communication link. It may be learned from FIG. 1 that there are a plurality of communication domains in a vehicle, and one of the plurality of communication domains includes one primary node and at least one secondary node. The primary node schedules the secondary node, so that service data is communicated between the primary node and the secondary node. For example, in FIG. 1, a mobile phone, a headset, and a wearable device belong to a communication domain and the communication domain is, for example, referred to as a communication domain 1, where the mobile phone is a primary node, and the headset and the wearable device are secondary nodes. A cockpit domain controller (CDC), a display, a microphone, and a speaker belong to a communication domain, and the communication domain is, for example, referred to as a communication domain 2, where the CDC is a primary node, and the display, the microphone, and the speaker are secondary nodes. A passive entry passive start (PEPS) system, a body control module (BCM), a mobile phone key, and a vehicle key belong to a communication domain, and the communication domain is, for example, referred to as a communication domain 3, where the PEPS system is a primary node, and the BCM, the mobile phone key, and the vehicle key are secondary nodes. In addition, a primary node in a communication domain may also be used as a secondary node in another communication domain. For example, the mobile phone in the communication domain 1 may be used as a secondary node in the communication domain 2.

Information communicated between the primary node and the secondary node may include service data and signaling, or some signals (such as a synchronization signal or a reference signal) may further be communicated between the primary node and the secondary node. The service data may include a type such as service data corresponding to a noise reduction service or service data corresponding to a dynamic service. The signaling may include a type such as physical layer signaling or higher layer signaling.

The noise reduction service is a common service that needs to be supported by vehicle-mounted communication, and the noise reduction service may be performed by the communication domain 2 shown in FIG. 1. The noise reduction service includes data transmission from the secondary node to the primary node. For example, the microphone used for noise reduction collects noise data in an environment, and sends the noise data to the CDC. The noise reduction service further includes data transmission from the primary node to the secondary node. For example, after receiving the noise data, the CDC may generate data whose amplitude is the same as that of the noise data and whose phase is opposite to that of the noise data, and send the data to the speaker, to implement noise reduction. A service volume of the noise reduction service ranges from several Mbps to dozens of Mbps, or even more, and accounts for a high proportion of a total service volume of the vehicle-mounted communication. The noise reduction service needs a large quantity of resources for communication. In addition, the noise reduction service further has the following features:

1. A single data packet is very small. For example, valid information may be only 16 bits (bit), 24 bits, or 32 bits.
2. A latency requirement is very high. For example, the latency requirement is less than or equal to 40 microseconds (p.$).
3. A periodicity is stable. For example, the periodicity is 1/48 kHz (approximately 20.83 µs).

In addition to the noise reduction service, the vehicle-mounted communication further needs to support communication of service data of a small quantity of dynamic services, and the communication of the service data of the small quantity of dynamic services is mainly used for some application layer information (for example, information related to a volume adjustment operation and the like) that do not have a high latency requirement, or signaling (for example, reporting a device fault) at layers above an access layer such as a device/network layer. In addition, communication at a physical layer further needs to support communication of the higher layer (for example, a media access control (MAC) layer) signaling, the physical layer signaling, or the like at the access layer. This type of dynamic service or signaling accounts for a small proportion of the total service volume of the vehicle-mounted communication. The communication of this type of dynamic service or signaling has the following common features:

1. A size of a data packet is in orders of magnitude of dozens to hundreds of bits.
2. A latency requirement is not high (above a millisecond-level), or there is no latency requirement.
3. This type of dynamic service or signaling occurs randomly and has no obvious periodicity. Therefore, the dynamic service may be considered as a non-periodic service.

In addition, the vehicle-mounted communication may further support a general service such as an audio service, a video service, a web browsing service, or a file transfer service. Data packets of these services are large, and may reach hundreds to thousands of bits. Service volumes of these services account for a high proportion of the total service volume of the vehicle-mounted communication.

In addition, the vehicle-mounted communication further needs to support an indication of a system overhead. The system overhead is an overhead generated by occupying a resource when system control information is communicated between the primary node and the secondary node. Therefore, in the vehicle-mounted communication, the primary node further needs to indicate time-frequency resources on which the system control information is communicated, so that the secondary node receives the system control information on the corresponding time-frequency resources.

It can be learned from the foregoing description that there are a plurality of types of service data and system control information in the communication domain that need to be communicated, and different data transmission or information transmission may occupy a same time-frequency resource or different time-frequency resources. Currently, a flexible resource scheduling manner is urgently required.

In view of this, embodiments of this application provide a resource scheduling method, to reduce resource scheduling overheads and flexibly implement resource scheduling.

A wireless communication scenario to which the technical solutions provided in embodiments of this application are applied may include wide area wireless communication, for example, communication between a plurality of base stations and a plurality of terminal devices, where the base station is used as a primary node, the terminal device is used as a secondary node, the base station allocates a resource to the terminal device, and the terminal device follows scheduling of the base station. Alternatively, the wireless communication scenario may include a short-range wireless communication scenario, for example, communication between a CDC and a vehicle-mounted speaker, a vehicle-mounted microphone, and a mobile phone, and communication between the mobile phone and a wearable device such as a headset. Alternatively, the wireless communication scenario may include local area wireless communication, for example, communication between a plurality of access points (APs) and a plurality of stations (station).

For example, a cockpit domain is a possible short-range communication scenario, and the technical solutions provided in embodiments of this application may be applied to a wireless communication scenario in a vehicle. In this case, a network architecture shown in FIG. 1 may be a network architecture that is applied to embodiments of this application. If the technical solutions provided in embodiments of this application are applied to another wide area wireless communication or local area wireless communication scenario, the network architecture that is applied to embodiments of this application correspondingly change.

Figure 2:
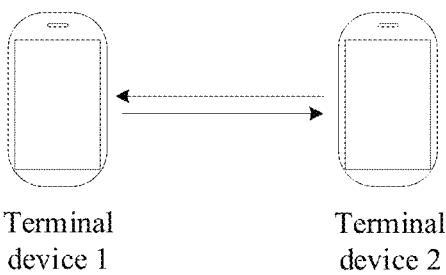
FIG. 2 is a schematic diagram of an application scenario of an embodiment of this application.

For another example, if the technical solutions provided in embodiments of this application are applied to a V2X communication scenario, refer to FIG. 2. FIG. 2 is a schematic diagram of an application scenario of the embodiment of this application. The scenario shown in FIG. 2 includes a terminal device 1 and a terminal device 2, and the terminal device 1 and the terminal device 2 may communicate with each other through a sidelink (SL).

Figure 3:
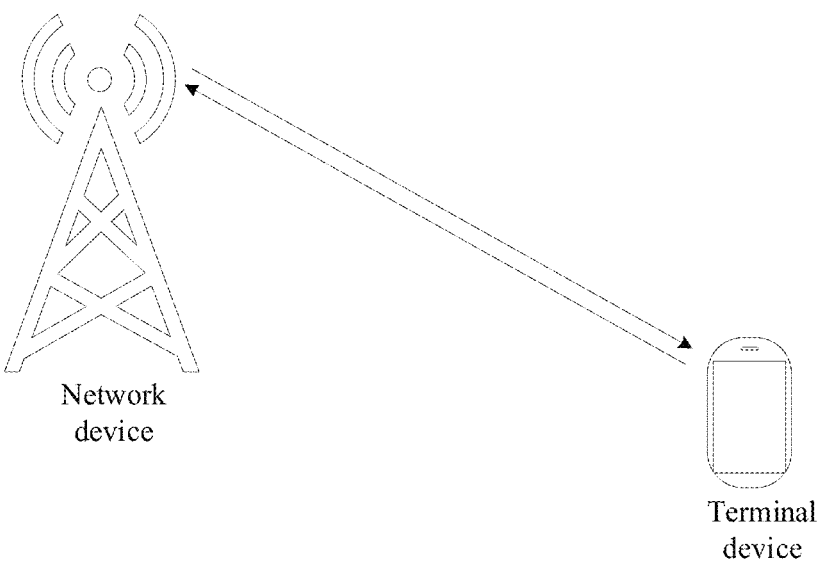
FIG. 3 is a schematic diagram of another application scenario of an embodiment of this application.

For still another example, if the technical solutions provided in embodiments of this application are applied to Uu interface communication in an LTE system or an NR system, refer to FIG. 3. FIG. 3 is a schematic diagram of an application scenario of the embodiment of this application. The scenario shown in FIG. 3 includes a network device and a terminal device. The network device and the terminal device may communicate with each other through a Uu interface.

It should be noted that in the application scenarios shown in FIG. 2 and FIG. 3, an example in which the terminal device is a mobile phone is used. However, a terminal device in embodiments of this application is not limited thereto.

The technical solutions provided in embodiments of this application are described below in detail with reference to the accompanying drawings.

An embodiment of this application provides a resource scheduling method. FIG. 4 is a flowchart of the method. In the following description process, an example in which the method is applied to a network architecture shown in any one of FIG. 1, FIG. 2, or FIG. 3 is used.

For ease of description, the following uses an example in which the method is performed by a first node and a second node. If an embodiment is applied to the network architecture shown in FIG. 1, the first node described below may be any secondary node in any communication domain shown in FIG. 1 and the first node may be, for example, the headset in the communication domain 1 or the microphone in the communication domain 2. Alternatively, the first node may be a chip system disposed in any secondary node in any communication domain shown in FIG. 1. The second node described below may be any primary node in any communication domain shown in FIG. 1 and the second node may be, for example, the mobile phone in the communication domain 1 or the CDC in the communication domain 2. Alternatively, the second node may be a chip system disposed in any primary node in any communication domain shown in FIG. 1. Alternatively, if an embodiment is applied to the network architecture shown in FIG. 2, the first node described below may be the terminal device 1 shown in FIG. 2, and the second node described below may be the terminal device 2 shown in FIG. 2. Alternatively, if an embodiment is applied to the network architecture shown in FIG. 3, the first node described below may be the terminal device shown in FIG. 3, and the second node described below may be the network device shown in FIG. 3.

The first node and the second node are located in the same communication domain. For example, the first node and the second node are located in a first communication domain. The second node is a primary node that manages the first communication domain, and the first node is any secondary node in the first communication domain. For example, if an embodiment is applied to the network architecture shown in FIG. 1, the first communication domain may be any communication domain in the network architecture shown in FIG. 1.

S401: The second node sends a first message to the first node, and the second node receives the first message from the first node, where the first message includes a first indication, the first indication indicates configuration information of a first resource, and the first resource is for communication of system control information and/or a system control signal.

In an embodiment, the first node and the second node may perform communication of the system control information and/or the system control signal. When the first node sends the system control information and/or the system control signal to the second node, the first node is a sending end node, and the second node is a receiving end node. When the second node sends the system control information and/or the system control signal to the first node, the second node is a sending end node, and the first node is a receiving end node.

The following further describes the system control information and the system control signal in an embodiment of the application.

For the system control information, before receiving the system control information, the receiving end node cannot learn content of the system control information. For example, after receiving the system control information, the receiving end node may decode the system control information to extract the content of the system control information. The system control information may be, for example, a message communicated in a communication system or some fields in the message.

In an embodiment, the system control information may include at least one of acknowledgment/negative acknowledgment feedback information, broadcast information, system information, physical layer control information, higher layer control information, access request information, scheduling request information, and channel feedback information. The acknowledgment/negative acknowledgment feedback information may be an acknowledgment response (ACK) or a negative acknowledgment response (NACK), and the acknowledgment/negative acknowledgment feedback information may also be used as the physical layer control information. The broadcast information is the system control information communicated in a broadcast manner. The system information is information used to transfer a related parameter of a communication domain, or parameter configuration information or a common configuration parameter of a primary node in the communication domain.

The physical layer control information is control information communicated at a physical layer and the physical layer control information is, for example, common control signaling. The higher layer control information is control information communicated at another protocol layer that is at an access layer and that is other than the physical layer. The broadcast information and the system information may be used as the higher layer control information, or may be used as the physical layer control information. The access request information is information used to request access to the receiving end node. The scheduling request information is information that is sent by a secondary node to the primary node and that is used to request the primary node to schedule a resource. The channel feedback information is information used by the secondary node to feedback channel quality to the primary node.

For the system control signal, before receiving the system control signal, the receiving end node may learn in advance a sequence corresponding to the system control signal, and after receiving the system control signal, the receiving end node may perform processing corresponding to the system control signal.

In an embodiment, the system control signal may include at least one of a synchronization signal, a demodulation reference signal, a phase tracking reference signal, a positioning reference signal or a channel status information reference signal, an access request signal, and a scheduling request signal. The synchronization signal is a signal that is sent by the sending end node and that is used for synchronization between the receiving end node and the sending end node. For example, after receiving the synchronization signal, the receiving end node obtains timing information and/or frequency information of the sending end node, and adjusts timing and/or frequency of the receiving end node, to implement synchronization with the sending end node. The demodulation reference signal is a signal used by the receiving end node to perform channel estimation and channel equalization. The phase tracking reference signal is a signal used by the receiving end node to track a phase change of a transmission channel, to assist in the channel estimation and the channel equalization. The positioning reference signal is a signal used to measure a distance between communication nodes or determine a geographical location of a communication node. The channel status information reference signal is a signal used to perform channel quality estimation. The access request signal is a signal used to request access to the receiving end node. The scheduling request signal is a signal that is sent by the secondary node to the primary node and that is used to request the primary node to perform resource allocation processing.

It may be understood that the foregoing system control information and system control signal are merely used as examples. Control information or a signal that is communicated in the communication system and that is used to transfer the related parameter of the communication domain, or the parameter configuration information or the common configuration parameter of the primary node in the communication domain may be used as the system control information or the system control signal in an embodiment of the application. This is not limited in this embodiment of this application.

It should be noted that, in an embodiment of the application, the system control information and the system control signal may either be sent in an uplink manner or be sent in a downlink manner, or the system control information and the system control signal are sent only in an uplink manner or sent only in a downlink manner. For example, the higher layer control information may either be sent in an uplink manner or be sent in a downlink manner, the access request information or the access request signal is sent only in an uplink manner, and the scheduling request signal or the scheduling request information is sent only in an uplink manner. Certainly, the foregoing description of transmission directions of the system control information and the system control signal is merely an example. The system control information and the system control signal may alternatively have other possible transmission direction definitions.

In an embodiment, if the first resource is for communication of the system control information and/or the system control signal, the first resource is a system overhead. The second node may send the first indication to the first node through the first message, where the first indication indicates the configuration information of the first resource. After receiving the first indication, the second node may determine, based on the first indication, a resource for communication of the system control information and/or the system control signal, and receive the system control information and/or the system control signal on the resource.

In an embodiment, the configuration information of the first resource may further be preconfigured for the first node. For example, an index of a time domain resource symbol occupied by the first resource in a time domain resource unit and an index of a frequency domain resource occupied by the first resource are preconfigured. Alternatively, the first node may determine the configuration information of the first resource according to a protocol specification.

It should be noted that, in an embodiment of the application, during uplink transmission or downlink transmission of the system control information and/or the system control signal, the first resource may have same or different configuration information. It may be understood that, if the configuration information of the first resource is different during the uplink transmission and the downlink transmission of the system control information and/or the system control signal, the second node may separately indicate configuration of the first resource during the uplink transmission and configuration of the first resource during the downlink transmission. For an indication manner, refer to the foregoing description of the first indication. Details are not described again.

In an embodiment, the first message further includes a second indication, the second indication indicates configuration information of a third resource, and the third resource is for communication of first data. The first data may be service data of a dynamic service or service data of a general service such as an audio service, a video service, a web browsing service, or a file transfer service In an embodiment, when the first message includes the second indication, the first message may be private scheduling signaling that is sent by the second node and that is used to schedule an available resource for the first node. The available resource may include the third resource in an embodiment of the application.

It should be noted that the third resource may be for communication of the first data, but the third resource may overlap the first resource. In this case, the first indication may further include a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the second node may further send a second message to the first node. The second message includes the fourth indication. The second message is different from the first message. For example, the second message may be the system information or higher layer signaling. In other words, the fourth indication may either be included in the first indication, or be carried in the second message. The following further describes meanings of the fourth indication in different scenarios.

1. When the first indication does not include the third indication, the fourth indication may indicate that the first resource overlaps the third resource, and indicate the time domain symbol information of the first overlapping resource. In other words, when the first indication does not include the third indication, the fourth indication may further indicate that the first resource overlaps the third resource. After receiving the fourth indication, the first node may directly determine the first overlapping resource based on the fourth indication.

2. When the first indication includes the third indication, and the third indication indicates that the first resource overlaps the third resource, the fourth indication indicates the time domain symbol information of the first overlapping resource. When the third indication indicates that the first resource does not overlap the third resource, the first overlapping resource indicated by the fourth indication does not exist, and the fourth indication cannot take effect. After receiving the third indication and the fourth indication, the first node needs to first determine that the third indication indicates that the first resource overlaps the third resource, and then determine the first overlapping resource based on the fourth indication.

The following further describes resources occupied by the third indication and the fourth indication and indication content.

1. Third Indication

The third indication may occupy 1 bit in the first message to indicate whether the third resource overlaps the first resource. For example, if a bit value corresponding to the bit is 0, it indicates that the third resource overlaps the first resource, and if the bit value corresponding to the bit is 1, it indicates that the third resource does not overlap the first resource.

The third indication may alternatively be a bitmap. In the bitmap, bit values corresponding to different bits may indicate whether time domain resource units that are in the third resource and that correspond to the bits overlap the first resource. The time domain resource unit may be a radio frame, a subframe, a slot, or the like, or the time domain resource unit may be a radio frame group including a plurality of radio frames, a subframe group including a plurality of subframes, a slot group including a plurality of slots, or the like. This is not limited in this application. For example, the time domain resource unit is a radio frame, and the bitmap includes 6 bits. When a bit value of the bitmap is 010011, it indicates that radio frames corresponding to the first, third, and fourth bits overlap the first resource, and radio frames corresponding to the second, fifth, and sixth bits do not overlap the first resource.

It may be understood that, in different communication systems, as an allocation granularity of a time domain resource, the time domain resource unit may be configured differently. In an embodiment, the time domain resource unit may be a symbol, a radio frame, a superframe, or the like. For example, in an LTE system, one radio frame is defined as 10 ms, one radio frame includes 10 subframes, one subframe is defined as 1 ms, and one slot is defined as 0.5 ms. In an NR system, definitions of one radio frame and one subframe are the same as those in the LTE system. That is, one radio frame is defined as 10 ms, and one subframe is defined as 1 ms. However, a length of one slot in the NR system is a configurable value. In a universal short-range communication system, duration of one radio frame is defined as 1/(48 kHz) (about 20.83 us). Further, a radio frame group including a plurality of radio frames may be defined as a superframe that includes a specified quantity of consecutive radio frames. For example, one superframe whose duration is 1 millisecond (ms) may include 48 consecutive radio frames, or according to a corresponding standard or protocol specification, one superframe may also include another fixed quantity of radio frames or a variable quantity of radio frames.

2. Fourth Indication

Assuming that the third resource includes N time domain resource units, and N is a positive integer, the fourth indication may include any one of the following:

(1) total quantity information of time domain symbols of the first overlapping resource in the N time domain resource units:

For example, the fourth indication may be 10, and it indicates that a total quantity of time domain symbols of the first overlapping resource in the third resource is 10.

(2) Quantity information of a time domain symbol of the first overlapping resource in each of the N time domain resource units, where quantity information of time domain symbols of the first overlapping resource in any two time domain resource units is the same or different:

For example, the time domain resource unit is a radio frame. Assuming that the third resource includes eight radio frames, that is, N is 8, the fourth indication may be quantity information of a time domain symbol of the first overlapping resource in each of the eight radio frames. For example, the fourth indication may be {2, 2, 1, 1, 1, 1, 1, 1}, and it indicates that a quantity of time domain symbols of the first overlapping resource in the first radio frame is 2, a quantity of time domain symbols of the first overlapping resource in the second radio frame is 2, and a quantity of time domain symbols of the first overlapping resource in the third radio frame is 1 . . . .

(3) At least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information:

For example, the time domain resource unit is a radio frame. In N radio frames included in the third resource, quantity information of a time domain symbol of the first overlapping resource included in each radio frame may be the same. For example, if both a first radio frame and a second radio frame include the first overlapping resource of two time domain symbols, the fourth indication may be the at least one piece of first quantity information, and a quantity of at least one radio frame corresponding to each piece of first quantity information in the N radio frames. For example, when the third resource includes eight radio frames, in other words, when N is 8, the fourth indication may be {(2,2), (1,6)}, and it indicates that a quantity of time domain symbols of the first overlapping resource included in each of two radio frames in the third resource is 2, and a quantity of time domain symbols of the first overlapping resource included in each of six radio frames in the third resource is 1.

It should be noted that the fourth indication may be a quantity of time domain symbols of the first overlapping resource, or the fourth indication may be an index of the time domain symbol of the first overlapping resource, or another parameter that may indicate the time domain symbol information of the first overlapping resource. This is not limited in this application.

When the fourth indication is the quantity of time domain symbols of the first overlapping resource, the first node may indicate a distribution rule of the time domain symbol of the first overlapping resource by sending the system information or the higher layer signaling to the second node, or specify the distribution rule of the time domain symbol of the first overlapping resource through a communication protocol specification, or preconfigure the distribution rule of the time domain symbol of the first overlapping resource for the second node. In this way, after receiving the fourth indication, the second node may determine the time domain symbol of the first overlapping resource based on the fourth indication and the distribution rule of the time domain symbol of the first overlapping resource.

The distribution rule of the time domain symbol of the first overlapping resource is an arrangement rule of the time domain symbol of the first overlapping resource in the N radio frames included in the third resource. For example, it is assumed that a default configuration of each radio frame is three downlink time domain symbols and five uplink time domain symbols, where the default configuration is a configuration of a time domain symbol used for uplink transmission and downlink transmission in each radio frame when the first resource for communication of the system control information and/or the system control signal is not configured. Refer to FIG. 5. The distribution rule of the time domain symbol of the first overlapping resource may be that, in time domain symbols that are in the radio frame and in a transmission direction and whose configurations are close to the front, a time domain symbol that is close to a guard period (GP) is used as the time domain symbol of the first overlapping resource. In an embodiment, if a radio frame includes one time domain symbol of the first overlapping resource, the time domain symbol of the first overlapping resource may be the third time domain symbol of the radio frame. If a radio frame includes two time domain symbols of the first overlapping resource, the time domain symbols of the first overlapping resource may be the second time domain symbol and the third time domain symbol in the radio frame. For example, when the fourth indication is a total quantity of the first overlapping resources, and the fourth indication is N+2, the first node may determine, based on the total quantity of the first overlapping resources and the distribution rule of the time domain symbol of the first overlapping resource, that in the N radio frames included in the third resource, the second time domain symbol and the third time domain symbol in first two radio frames are the time domain symbols of the first overlapping resource, and the third time domain symbols in the third radio frame to the Nth radio frame are the time domain symbols of the first overlapping resource.

It should be noted that the default configuration of each radio frame is not limited to the foregoing example. For example, the default configuration of each radio frame may also be four downlink time domain symbols and four uplink time domain symbols. In the foregoing example of the default configuration of the radio frame, a time domain symbol in a downlink transmission direction is in front of a time domain symbol in an uplink transmission direction. In an embodiment, the default configuration of each radio frame may be that the time domain symbol in the uplink transmission direction is in front of the time domain symbol in the downlink transmission direction. This is not limited in this application.

Certainly, the distribution rule of the time domain symbol of the first overlapping resource is not limited to the foregoing example. For example, in time domain symbols that are in the radio frame and in the transmission direction and whose configurations are close to the end, a time domain symbol that is close to the GP is used as the time domain symbol of the first overlapping resource. Alternatively, in time domain symbols that are in the uplink transmission direction in the radio frame, a time domain symbol that is close to the GP is used as the time domain symbol of the first overlapping resource. Alternatively, in time domain symbols that are in the downlink transmission direction in the radio frame, a time domain symbol that is close to the GP is used as the time domain symbol of the first overlapping resource.

S402: The second node communicates the first data with the first node by using a second resource, and the first node performs communication of the first data by using the second resource, where the second resource does not overlap the first resource.

In an embodiment, if the first indication includes the third indication and the fourth indication, the first node may determine the third resource based on the received second indication, determine the first resource based on the received first indication, and when determining that the third indication indicates that the first resource overlaps the third resource, determine the first overlapping resource based on the fourth indication. The first node may use a resource, in the third resource, other than the first overlapping resource as the second resource.

In an embodiment, the second node may communicate the first data with the first node by using the second resource. For example, the second node may communicate the audio service data with the first node by using the second resource. The first node may communicate the first data with the second node by using the second resource, or the first node may communicate the first data with a third node by using the second resource. The third node may be another secondary node that belongs to a same communication domain as the first node. In other words, in an embodiment of the application, the second resource may be for communication of the first data between the primary node and the secondary node, or may be for communication of the first data between the secondary node and the secondary node.

According to the resource scheduling method, the second node may send the first indication to the first node through the first message, to indicate the configuration information of the first resource, and therefore indicate the resource for communication of the system control information and/or the system control signal. The second node may communicate the first data with the first node by using the second resource that is different from the first resource. According to this solution, a flexible resource scheduling method is provided. The second node sends the first indication to the first node through the first message, to reduce resource scheduling overheads. In addition, the second node directly sends the first message to the first node, so that resource scheduling reliability is improved.

In an embodiment of the application, the second node may further send a fifth indication. The fifth indication indicates configuration information of a fourth resource that belongs to another communication domain. The another communication domain is different from a communication domain managed by the second node. It may be understood that the another communication domain may also include the second node, but the second node is not a primary node in the another communication domain. For example, the second node may be a secondary node in the another communication domain.

In an embodiment, the fifth indication may be carried in the first message or a third message different from the first message. The following separately describes different manners in which the second node sends the fifth indication.

Manner 1: The first message further includes the fifth indication.

In an embodiment, the first message may further include the fifth indication, and the fifth indication indicates the configuration information of the fourth resource that belongs to the another communication domain, for example, an index of the fourth resource. In this case, the first node may determine the fourth resource based on the fifth indication, to perform communication of the first data by using a resource, in the third resource, other than the fourth resource when communicating with the second node.

Manner 2: The second node sends the third message, where the third message includes the fifth indication, the fifth indication indicates the configuration information of the fourth resource that belongs to the another communication domain, and the third message is different from the first message.

In an embodiment, the first node may further send the fifth indication through the third message, where the third message may be the system information, or the third message may be the higher layer signaling. The fifth indication indicates the configuration information of the fourth resource that belongs to the another communication domain, for example, an index of the fourth resource. After receiving the third message, the first node may determine the fourth resource based on the fifth indication, to send or receive the first data by using a resource, in the third resource, other than the fourth resource when communicating with the second node.

It may be understood that, in a communication process, the first node and the second node do not occupy a resource of another communication domain different from the communication domain to which the first node belongs and the communication domain to which the second node belongs. In other words, the fourth resource is not used when the first node communicates with the second node. Therefore, the second node may send the fifth indication to the first node through the first message or the third message, to indicate the fourth resource. After receiving the fifth indication, the first node may determine the fourth resource based on the fifth indication, so that the first node may determine the resource, in the third resource, other than the fourth resource as the second resource, and perform communication of the first data by using the second resource, to avoid a resource conflict between different communication domains.

In an embodiment of the application, second data that meets the following features further needs to be communicated between the first node and the second node:

1. A single data packet is very small. For example, valid information may be only 16 bits (bit), 24 bits, or 32 bits.
2. A latency requirement is very high. For example, the latency requirement is less than or equal to 40 microseconds (p.$).
3. A periodicity is stable. For example, the periodicity is 1/48 kHz (approximately 20.83 μs).

For example, the second data may be noise reduction service data.

It can be learned from the foregoing features of the second data that the periodicity of the second data is stable, and the latency requirement is very high. In this case, when scheduling a fifth resource for communication of the second data, the second node needs to ensure that the first node can determine the fifth resource in time and receive the second data. In addition, not all communication domains need communication of the second data. For example, the second data is the noise reduction service data. Many communication domains do not support a noise reduction service. Therefore, in these communication domains, the second node does not need to configure the fifth resource for the first node.

Based on the foregoing analysis, in an embodiment of the application, the second node may further send a sixth indication. The sixth indication indicates whether to configure the fifth resource. The fifth resource is for communication of the second data. After receiving the sixth indication, the first node may determine whether the second node has configured the fifth resource, that is, whether a service corresponding to the second data exists in the communication domain managed by the second node.

In an embodiment, the sixth indication may be carried in the first message or a fourth message different from the first message. The following separately describes different manners in which the second node sends the sixth indication.

Manner 1: The first message further includes the sixth indication.

In an embodiment, the second node sends the first message to the first node. The first message may include the first indication, and may further include the sixth indication.

Manner 2: The second node sends the fourth message, where the fourth message includes the sixth indication.

In an embodiment, the second node may send the fourth message. The fourth message includes the sixth indication. The fourth message may be the system information, or the fourth message may be the higher layer signaling.

In an embodiment, the second node may further send a seventh indication. The seventh indication indicates configuration information of the fifth resource. In an embodiment, the second node may send both the sixth indication and the seventh indication. In this case, after receiving the sixth indication and determining that the sixth indication indicates the second node to configure the fifth resource, the first node may determine the fifth resource based on the seventh indication. Alternatively, the second node may not send the sixth indication, but send the seventh indication to the first node. In this case, when receiving the seventh indication, the first node may directly determine the fifth resource based on the seventh indication. In other words, the seventh indication may also indicate that the second node has configured the fifth resource and indicate the configuration information of the fifth resource.

The following separately describes different manners in which the second node sends the seventh indication in an embodiment of the application.

Manner 1: The first node sends the system information, where the system information includes the seventh indication.

Manner 2: The first node sends the fifth message at least P times in one periodicity, where the fifth message includes the seventh indication, the seventh indication indicates the configuration information of the fifth resource, the one periodicity includes M superframes, M is a positive integer not less than 2, and P is a positive integer less than M.

It should be noted that, one superframe may be defined as including a specified quantity of consecutive radio frames. For example, one superframe may include 48 consecutive radio frames.

In an embodiment, the fifth message may be the physical layer signaling. For example, the fifth message may be the common control signaling. The common control signaling is signaling that is sent by the second node in a broadcast manner and that is used to send indication information to the secondary node in the communication domain managed by the second node.

In an embodiment, because the periodicity of the second data is stable, the M superframes may be used as the one periodicity. In the one periodicity, the second node sends the fifth message to the first node once or more times, to indicate the configuration information of the fifth resource in a next periodicity, and the one periodicity is used as a change periodicity of the fifth resource. When the second node sends the fifth message to the first node a plurality of times, the fifth message sent after the second time may be used as a resending message of the fifth message sent for the first time, so that after receiving the fifth message a plurality of times, the first node may perform comparison to check whether the fifth message received for the first time is accurate, to improve accuracy of a fifth resource indication method.

It should be noted that, when the one periodicity includes the M superframes, if the first node sends the fifth message P times in the one periodicity, P is a positive integer less than M. In other words, in the one periodicity, a quantity of times that the second node sends the fifth message cannot be greater than the quantity of superframes included in the periodicity.

In an embodiment, when the second node sends the seventh indication through the fifth message, the second node may further indicate configuration information of the fifth message, which may be:

1. The second node sends configuration information of a sixth resource or indication information indicating configuration information of a sixth resource, where the sixth resource is for communication of the fifth message.

In an embodiment, before sending the fifth message, the second node may send, to the first node, the configuration information of the sixth resource for communication of the fifth message or the indication information indicating the configuration information of the sixth resource, so that after receiving the configuration information of the sixth resource or the indication information indicating the configuration information of the sixth resource, the first node can determine the sixth resource, and receive the fifth message on the sixth resource.

The second node may directly send the configuration information of the sixth resource to the first node, or the second node sends indication information of the configuration information of the sixth resource to the first node. For example, the second node may directly send time-frequency domain resource information (for example, a time-frequency domain resource index) of the sixth resource to the first node. Alternatively, the second node may send the indication information of the configuration information of the sixth resource to the first node. For example, the second node preconfigures a plurality of groups of configuration information of the sixth resource for the first node. The second node may send the indication information of the configuration information of the sixth resource to the first node. For example, the indication information of the configuration information of the sixth resource may be an index value of a group of configuration information of the sixth resource. After receiving the indication information that is of the configuration information of the sixth resource and that is sent by the second node, the first node may determine, from the plurality of groups of configuration information of the sixth resource, the configuration information of the sixth resource used when the second node currently performs communication of the fifth message.

2. The second node sends first quantity information or indication information of first quantity information, where the first quantity information indicates the quantity M of superframes included in the one periodicity.

The first quantity information may be, for example, the quantity M, or may be an index of the superframe in the one periodicity. In other words, a form of the first quantity information is not limited in this application. All information that may indicate the quantity M of superframes included in the one periodicity is applicable.

For example, the second node may directly use the quantity M of superframes included in the one periodicity as the first quantity information, and send the first quantity information to the first node. Alternatively, the second node preconfigures a first quantity information set (which may be, for example, a quantity information table) for the first node. The second node sends indication information to the first node, where the indication information may include an index value. After receiving the indication information, the first node may search for, based on the index value included in the indication information, first quantity information corresponding to the index value from the preconfigured first quantity information set, to determine the quantity M of superframes included in the one periodicity.

In an embodiment, the first quantity information may further be preconfigured on the first node, or the first quantity information is specified in a protocol.

3. The second node sends second quantity information or indication information of second quantity information, where the second quantity information indicates the quantity P of times of sending the fifth message in the one periodicity.

For example, the second node may use the quantity P of times of sending the fifth message in the one periodicity as the second quantity information, and send the second quantity information to the first node. Alternatively, the second node preconfigures a plurality of pieces of second quantity information for the first node. The second node may send the indication information indicating the second quantity information. For example, the indication information may include an index value of the second quantity information. After receiving the indication information, the first node may search for, based on the index value included in the indication information, second quantity information corresponding to the index value from the plurality of pieces of preconfigured second quantity information, to determine the quantity P of times of sending the fifth message in the one periodicity.

In an embodiment, the second node may separately send the plurality of pieces of configuration information of the fifth message through different messages. For example, the second node sends a sixth message, where the sixth message includes the configuration information of the sixth resource or the indication information indicating the configuration information of the sixth resource; the second node sends a seventh message, where the seventh message includes the first quantity information or the indication information of the first quantity information; and the second node sends an eighth message, where the eighth message includes the second quantity information or the indication information of the second quantity information. Alternatively, the second node may integrate the plurality of pieces of configuration information of the fifth message into one or more messages. In other words, the configuration information of the fifth message may be a piece of multiplexed joint indication information, and the joint indication information may include the foregoing three types of configuration information of the fifth messages. Certainly, another manner in which the configuration information of the fifth message can be indicated is also applicable. This is not limited in this application.

It may be understood that, the fifth resource is for communication of the second data. In this case, when the second node communicates with the first node, if there is the second data that needs to be communicated, the fifth resource is not occupied when the second node communicates the first data with the first node. Therefore, after receiving the sixth indication, if the first node determines that the sixth indication indicates to configure the fifth resource, the first node determines the configuration information of the fifth resource based on the received seventh indication, to determine the fifth resource. The first node may perform communication of the second data by using the fifth resource. It should be noted that, if the fifth resource overlaps with the third resource, the first node needs to determine a resource, in the third resource, other than a resource that overlaps with the fifth resource as the second resource, and then perform communication of the first data by using the second resource.

The following further describes the resource scheduling manner provided in an embodiment of the application by using several examples.

Example 1

FIG. 6 is a flowchart of the first example according to an embodiment of this application. The example includes the following operations.

S601: A second node sends a first message, and a first node receives the first message from the second node, where the first message includes a first indication and a second indication, the first indication indicates configuration information of a first resource, the first resource is for communication of system control information and/or a system control signal, the second indication indicates configuration information of a third resource, the third resource includes a second resource, the first indication includes a third indication and a fourth indication, the third indication indicates that the third resource overlaps the first resource, the fourth indication indicates time domain symbol information of a first overlapping resource, and the first overlapping resource is an overlapping resource between the third resource and the first resource.

S602: A first node determines the first resource based on the first indication.

S603: The second node sends the system control information and/or the system control signal to the first node by using the first resource, and the first node receives the system control information and/or the system control signal from the second node on the first resource.

S604: The first node determines the third resource based on the second indication.

It should be noted that in an embodiment, the first node may determine the third resource based on the second indication and other configuration information. For example, when the second indication is quantity information of the third resource, the first node may determine the third resource based on the quantity information of the third resource and a preconfigured distribution rule of the third resource.

S605: The first node determines that the third indication indicates that the third resource overlaps the first resource, and determines the time domain symbol information of the first overlapping resource based on the fourth indication.

S606: The first node determines, based on the determined third resource and the time domain symbol information of the first overlapping resource, a resource, in the third resource, other than the first overlapping resource as the second resource.

S607: The second node sends first data to the first node by using the second resource, and the first node receives the first data on the second resource.

Example 2

FIG. 7 is a flowchart of the second example according to an embodiment of this application. The example includes the following operations.

S701: A second node sends a first message, and a first node receives the first message from the second node, where the first message includes a first indication and a second indication, the first indication indicates configuration information of a first resource, the first resource is for communication of system control information and/or a system control signal, the second indication indicates configuration information of a third resource, the third resource includes a second resource, the first indication includes a fourth indication, the fourth indication indicates time domain symbol information of a first overlapping resource, and the first overlapping resource is an overlapping resource between the third resource and the first resource.

S702: The second node sends a third message, and the first node receives the third message from the second node, where the third message includes a fifth indication, the fifth indication indicates configuration information of a fourth resource that belongs to another communication domain, and the another communication domain is different from a communication domain managed by the second node.

S703: The first node determines the first resource based on the first indication.

S704: The second node sends the system control information and/or the system control signal to the first node by using the first resource, and the first node receives the system control information and/or the system control signal from the second node on the first resource.

S705: The first node determines the third resource based on the second indication, determines the time domain symbol information of the first overlapping resource based on the fourth indication, and determines the fourth resource based on the fifth indication.

S706: The first node determines a resource, in the third resource, other than the first overlapping resource and the fourth resource as the second resource.

S707: The second node sends first data to the first node by using the second resource, and the first node receives the first data on the second resource.

Example 3

Figure 8:
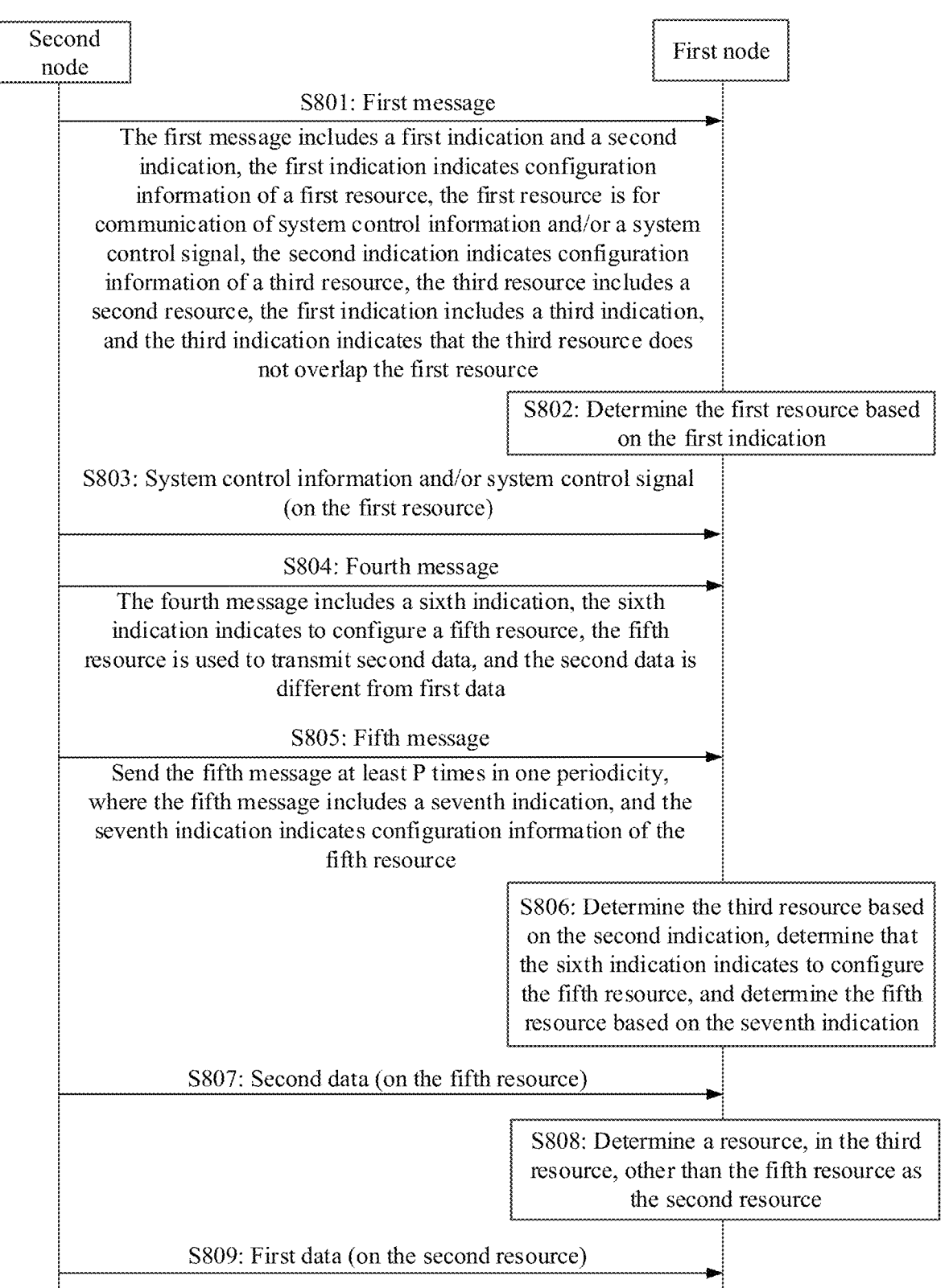
FIG. 8 of is a flowchart of a third example according to an embodiment of this application.

FIG. 8 is a flowchart of the third example according to an embodiment of this application. The example includes the following operations.

S801: A second node sends a first message, and a first node receives the first message from the second node, where the first message includes a first indication and a second indication, the first indication indicates configuration information of a first resource, the first resource is for communication of system control information and/or a system control signal, the second indication indicates configuration information of a third resource, the third resource includes a second resource, the first indication includes a third indication, and the third indication indicates that the third resource does not overlap the first resource.

S802: The first node determines the first resource based on the first indication.

S803: The second node sends the system control information and/or the system control signal to the first node by using the first resource, and the first node receives the system control information and/or the system control signal from the second node on the first resource.

S804: The first node sends a fourth message, where the fourth message includes a sixth indication, the sixth indication indicates to configure a fifth resource, the fifth resource is for communication of second data, and the second data is different from first data.

S805: The first node sends a fifth message at least P times in one periodicity, where the fifth message includes a seventh indication, and the seventh indication indicates configuration information of the fifth resource.

S806: The second node determines the third resource based on the second indication, determines that the sixth indication indicates to configure the fifth resource, and determines the fifth resource based on the seventh indication.

S807: The second node sends the second data to the first node by using the fifth resource, and the first node receives the second data on the fifth resource.

S808: The first node determines a resource, in the third resource, other than the fifth resource as the second resource.

S809: The second node sends the first data to the first node by using the second resource, and the first node receives the first data on the second resource.

Example 4

FIG. 9 is a flowchart of the third example according to an embodiment of this application. The example includes the following operations.

S901: A second node sends a first message, and a first node receives the first message from the second node, where the first message includes a first indication and a second indication, the first indication indicates configuration information of a first resource, the first resource is for communication of system control information and/or a system control signal, the second indication indicates configuration information of a third resource, the third resource includes a second resource, the first indication includes a third indication and a fourth indication, the third indication indicates that the third resource overlaps the first resource, the fourth indication indicates time domain symbol information of a first overlapping resource, and the first overlapping resource is an overlapping resource between the third resource and the first resource.

S902: The first node determines the first resource based on the first indication.

S903: The second node sends the system control information and/or the system control signal to the first node by using the first resource, and the first node receives the system control information and/or the system control signal from the second node on the first resource.

S904: The second node sends a fourth message, where the fourth message includes a fifth indication and a sixth indication, the fifth indication indicates configuration information of a fourth resource that belongs to another communication domain, the another communication domain is different from a communication domain managed by the second node, the sixth indication indicates to configure a fifth resource, the fifth resource is for communication of second data, and the second data is different from first data.

S905: The second node sends system information, where the system information includes a seventh indication, and the seventh indication indicates configuration information of the fifth resource.

S906: The first node determines that the third indication indicates that the first resource overlaps the third resource, and determines the time domain symbol information of the first overlapping resource based on the fourth indication; the first node determines the fourth resource based on the fifth indication; and the first node determines that the sixth indication indicates to configure the fifth resource, and determines the fifth resource based on the seventh indication.

S907: The second node sends the second data to the first node by using the fifth resource, and the first node receives the second data on the fifth resource.

S908: The first node determines a resource, in the third resource, other than the first overlapping resource, the fourth resource, and the fifth resource as the second resource.

S909: The second node sends the first data to the first node by using the second resource, and the first node receives the first data on the second resource.

Figure 10:
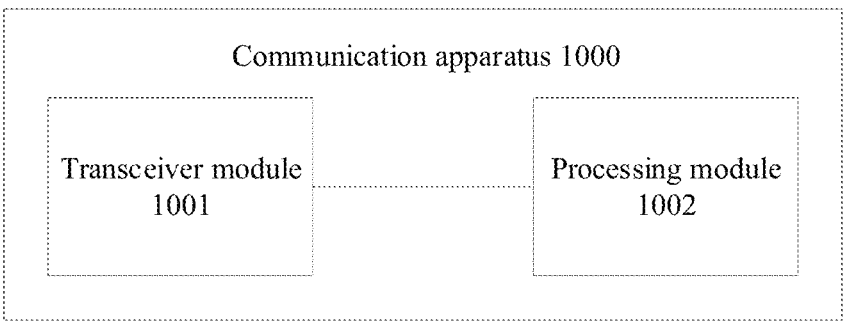
FIG. 10 is a schematic diagram of a structure of a communication apparatus according to an embodiment of this application.

Based on a same technical concept, this application further provides a communication apparatus 1000. A structure of the apparatus is shown in FIG. 10, and the apparatus includes a transceiver module 1001 and a processing module 1002. The communication apparatus 1000 may be applied to any device or vehicle-mounted module in the vehicle-mounted communication link shown in FIG. 1, or may be applied to a chip in the vehicle-mounted module or another combined device or component that has a function of the foregoing vehicle-mounted module. The communication apparatus 1000 may further be applied to any terminal device in the system shown in FIG. 2 and the network device or the terminal device in the system shown in FIG. 3. In other words, the communication apparatus 1000 may be applied to any first node or second node in the scenarios shown in FIG. 1 to FIG. 3, and may implement the resource scheduling method shown in FIG. 4 and FIG. 6 to FIG. 9. The following describes functions of units in the communication apparatus 1000.

When the communication apparatus 1000 is the vehicle-mounted module, the transceiver module 1001 may be a transceiver, and the transceiver may include a radio frequency circuit, and the like. The processing module 1002 may be a processor, for example, a baseband processor, and the baseband processor may include one or more central processing modules (CPU). When the communication apparatus 1000 is the component that has the function of the foregoing vehicle-mounted module, the transceiver module 1001 may be a radio frequency unit, and the processing module 1002 may be a processor, for example, a baseband processor. When the communication apparatus 1000 is a chip system, the transceiver module 1001 may be an input/output interface of a chip (for example, a baseband chip), and the processing module 1002 may be a processor of the chip system, and may include one or more central processing modules. It should be understood that the processing module 1002 in an embodiment of the application may be implemented by a processor or a processor-related circuit component, and the transceiver module 1001 may be implemented by a transceiver or a transceiver-related circuit component.

For example, the processing module 1002 may be configured to perform all operations, except sending and receiving operations, performed by the first node or the second node in the embodiment shown in FIG. 4, for example, an operation of generating the first message by the first node, and/or configured to support another process of the technology described in this specification. The transceiver module 1001 may be configured to perform all sending and receiving operations performed by the first node or the second node in the embodiment shown in FIG. 4, for example, S401 to S402, and/or configured to support another process of the technology described in this specification.

In addition, when the communication apparatus is applied to the network device shown in FIG. 3, the transceiver module may alternatively be a physical interface, a communication module, a communication interface, or an input/output interface. The network device may be connected to a network cable or a cable through the transceiver module, to establish a physical connection to another device.

The following describes functions of the processing module 1002 when the communication apparatus 1000 is applied to a second node.

In an embodiment of the application, when the communication apparatus 1000 is applied to a second node in a resource scheduling method provided in embodiments of this application, the communication apparatus 1000 may implement functions performed by the second node in the resource scheduling method shown in FIG. 4 and FIG. 6 to FIG. 9 in this application. The functions of the processing module 1002 are described as follows.

The processing module 1002 is configured to: send a first message to a first node through the transceiver module 1001, where the first message includes a first indication, the first indication indicates configuration information of a first resource, and the first resource is for communication of system control information and/or a system control signal; and communicate first data with the first node by using a second resource through the transceiver module 1001, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processing module 1002 is further configured to send a second message through the transceiver module 1001. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processing module 1002 is further configured to send a fifth indication through the transceiver module 1001. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the processing module 1002 is further configured to send a sixth indication through the transceiver module 1001. The sixth indication indicates whether to configure a fifth resource. The fifth resource is for communication of second data. The second data is different from the first data. The sixth indication is carried in the first message or a fourth message different from the first message.

In an embodiment, the processing module 1002 is further configured to send system information through the transceiver module 1001. The system information includes a seventh indication. The seventh indication indicates configuration information of the fifth resource. The fifth resource is for communication of the second data. The second data is different from the first data.

In an embodiment, the processing module 1002 is further configured to send a fifth message at least P times in one periodicity through the transceiver module 1001. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processing module 1002 is further configured to send, through the transceiver module 1001, configuration information of a sixth resource or indication information indicating configuration information of a sixth resource. The sixth resource is for communication of the fifth message.

In an embodiment, the processing module 1002 is further configured to send, through the transceiver module 1001, first quantity information or indication information of first quantity information. The first quantity information indicates the quantity M of superframes included in the one periodicity.

In an embodiment, the processing module 1002 is further configured to send, through the transceiver module 1001, second quantity information or indication information of second quantity information. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

The following describes functions of the processing module 1002 when the communication apparatus 1000 is applied to a first node.

In an embodiment of the application, when the communication apparatus 1000 is applied to a first node in a resource scheduling method provided in embodiments of this application, the communication apparatus 1000 may implement functions performed by the first node in the resource scheduling method shown in FIG. 4 and FIG. 6 to FIG. 9 in this application. The functions of the processing module 1002 are described as follows.

The processing module 1002 is configured to: receive a first message from a second node through the transceiver module 1001, where the first message includes a first indication, the first indication indicates configuration information of a first resource, and the first resource is for communication of system control information and/or a system control signal; and perform communication of first data by using a second resource through the transceiver module 1001, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processing module 1002 is further configured to receive a second message from the second node through the transceiver module 1001. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processing module 1002 is further configured to: before performing communication of the first data by using the second resource through the transceiver module 1001, determine the second resource based on the first indication and the second indication.

In an embodiment, the processing module 1002 is further configured to receive a fifth indication from the second node through the transceiver module 1001. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the processing module 1002 is further configured to receive a sixth indication from the second node through the transceiver module 1001. The sixth indication indicates whether to configure a fifth resource. The fifth resource is for communication of second data. The second data is different from the first data. The sixth indication is carried in the first message or a fourth message different from the first message.

In an embodiment, the processing module 1002 is further configured to receive system information from the second node through the transceiver module 1001. The system information includes a seventh indication. The seventh indication indicates configuration information of the fifth resource. The fifth resource is for communication of the second data. The second data is different from the first data.

In an embodiment, the processing module 1002 is further configured to receive a fifth message at least P times in one periodicity through the transceiver module 1001. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processing module 1002 is further configured to receive, from the second node through the transceiver module 1001, configuration information of a sixth resource or indication information indicating configuration information of a sixth resource. The sixth resource is for communication of the fifth message.

In an embodiment, the processing module 1002 is further configured to receive, from the second node through the transceiver module 1001, first quantity information or indication information of first quantity information. The first quantity information indicates the quantity M of superframes included in the one periodicity.

In an embodiment, the processing module 1002 is further configured to receive, from the second node through the transceiver module 1001, second quantity information or indication information of second quantity information. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

Figure 11:
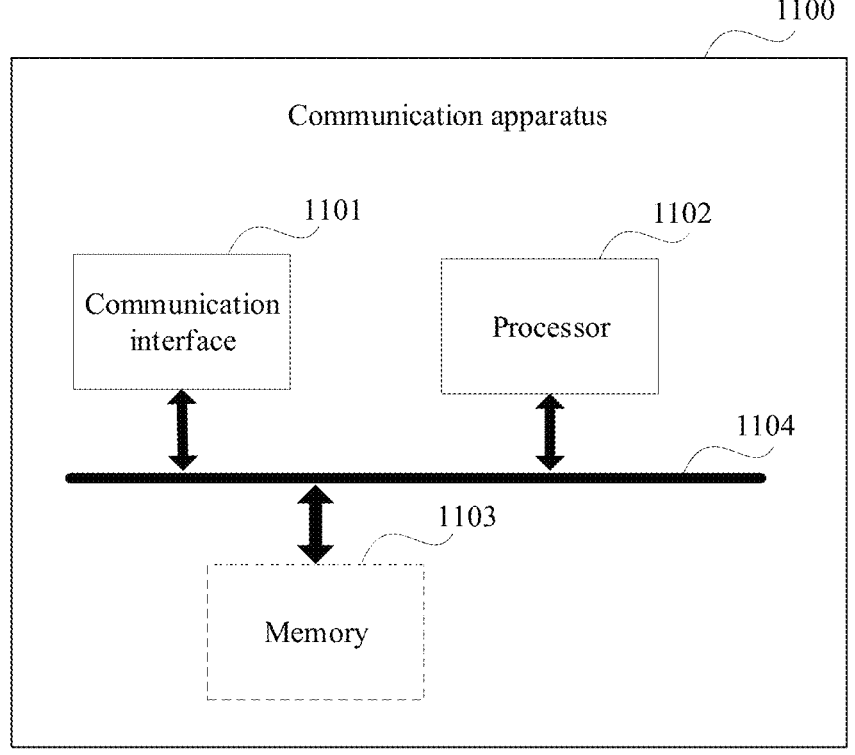
FIG. 11 is a schematic diagram of a structure of a communication apparatus according to an embodiment of this application.

Based on a same technical concept, this application further provides a communication apparatus 1100. FIG. 11 is a schematic diagram of a structure of the communication apparatus 1100 according to an embodiment of this application. The communication apparatus 1100 may be applied to any device or vehicle-mounted module in the vehicle-mounted communication link shown in FIG. 1, or may be applied to a chip in the vehicle-mounted module or another combined device or component that has a function of the foregoing vehicle-mounted module. The communication apparatus 1100 may further be applied to any terminal device in the system shown in FIG. 2 and the network device or the terminal device in the system shown in FIG. 3. In other words, the communication apparatus 1100 may be applied to any first node or second node in the scenarios shown in FIG. 1 to FIG. 3, and may implement the resource scheduling method shown in FIG. 4 and FIG. 6 to FIG. 9. As shown in FIG. 11, the communication apparatus 1100 includes a communication interface 1101 and a processor 1102. Further, in an embodiment, the communication apparatus 1100 may include a memory 1103. The communication interface 1101, the processor 1102, and the memory 1103 are connected to each other. It should be noted that the communication apparatus 1100 may include at least one processor 1102 and at least one memory 1103. An example in which the communication apparatus 1100 includes one processor 1102 and one memory 1103 is shown in FIG. 11.

In an embodiment, the communication interface 1101, the processor 1102, and the memory 1103 are connected to each other through a bus 1104. The bus 1104 may be a peripheral component interconnect (PCI) bus, an extended industry standard architecture (EISA) bus, or the like. The bus may be categorized as an address bus, a data bus, a control bus, or the like. For ease of representation, only one bold line represents the bus in FIG. 11, but this does not mean that there is only one bus or only one type of bus.

The communication interface 1101 is configured to receive and send data, to implement communication and interaction with another device. For example, the communication interface 1101 may be a transceiver, a circuit, a bus, a module, or another type of communication interface.

The memory 1103 is configured to store instructions. The processor 1102 is configured to execute the instructions stored in the memory 1103. The memory 1103 stores program code, and the processor 1102 may invoke the program code stored in the memory 1103 to perform the resource scheduling method provided in embodiments of this application.

In an embodiment of the application, when the communication apparatus 1100 is applied to a second node in a resource scheduling method provided in embodiments of this application, the communication apparatus 1100 may implement functions performed by the second node in the resource scheduling method shown in FIG. 4 and FIG. 6 to FIG. 9 in this application. Functions of the processor 1102 are described as follows.

The processor 1102 is configured to: send a first message to a first node through the communication interface 1101, where the first message includes a first indication, the first indication indicates configuration information of a first resource, and the first resource is for communication of system control information and/or a system control signal; and communicate first data with the first node by using a second resource through the communication interface 1101, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processor 1102 is further configured to send a second message through the communication interface 1101. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processor 1102 is further configured to send a fifth indication through the communication interface 1101. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the processor 1102 is further configured to send a sixth indication through the communication interface 1101. The sixth indication indicates whether to configure a fifth resource. The fifth resource is for communication of second data. The second data is different from the first data. The sixth indication is carried in the first message or a fourth message different from the first message.

In an embodiment, the processor 1102 is further configured to send system information through the communication interface 1101. The system information includes a seventh indication. The seventh indication indicates configuration information of the fifth resource. The fifth resource is for communication of the second data. The second data is different from the first data.

In an embodiment, the processor 1102 is further configured to send a fifth message at least P times in one periodicity through the communication interface 1101. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processor 1102 is further configured to send, through the communication interface 1101, configuration information of a sixth resource or indication information indicating configuration information of a sixth resource. The sixth resource is for communication of the fifth message.

In an embodiment, the processor 1102 is further configured to send, through the communication interface 1101, first quantity information or indication information of first quantity information. The first quantity information indicates the quantity M of superframes included in the one periodicity.

In an embodiment, the processor 1102 is further configured to send, through the communication interface 1101, second quantity information or indication information of second quantity information. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

In an embodiment of the application, when the communication apparatus 1100 is applied to a first node in a resource scheduling method provided in embodiments of this application, the communication apparatus 1100 may implement functions performed by the first node in the resource scheduling method shown in FIG. 4 and FIG. 6 to FIG. 9 in this application. Functions of the processor 1102 are described as follows.

The processor 1102 is configured to: receive a first message from a second node through the communication interface 1101, where the first message includes a first indication, the first indication indicates configuration information of a first resource, and the first resource is for communication of system control information and/or a system control signal; and perform communication of first data by using a second resource through the communication interface 1101, where the second resource does not overlap the first resource.

In an embodiment, the first message further includes a second indication. The second indication indicates configuration information of a third resource. The third resource includes the second resource. The first indication includes a third indication and/or a fourth indication. The third indication indicates whether the third resource overlaps the first resource. The fourth indication indicates time domain symbol information of a first overlapping resource. The first overlapping resource is an overlapping resource between the third resource and the first resource.

In an embodiment, the processor 1102 is further configured to receive a second message from the second node through the communication interface 1101. The second message includes the fourth indication, and the second message is different from the first message.

In an embodiment, the third resource includes N time domain resource units, and N is a positive integer. The fourth indication includes total quantity information of time domain symbols of the first overlapping resource in the N time domain resource units. Alternatively, the fourth indication includes quantity information of a time domain symbol of the first overlapping resource in each of the N time domain resource units, where quantity information of time domain symbols of the first overlapping resource in any two of the N time domain resource units is the same or different. Alternatively, the fourth indication includes at least one piece of first quantity information, and a quantity of at least one time domain resource unit corresponding to each piece of first quantity information in the N time domain resource units, where quantity information of a time domain symbol of the first overlapping resource in each of the at least one time domain resource unit corresponding to any piece of first quantity information is the first quantity information.

In an embodiment, the processor 1102 is further configured to: before performing communication of the first data by using the second resource through the communication interface 1101, determine the second resource based on the first indication and the second indication.

In an embodiment, the processor 1102 is further configured to receive a fifth indication from the second node through the communication interface 1101. The fifth indication indicates configuration information of a fourth resource that belongs to another communication domain. The another communication domain is different from a communication domain managed by the second node. The second node is a communication node sending the first message. The fifth indication is carried in the first message or a third message different from the first message.

In an embodiment, the processor 1102 is further configured to receive a sixth indication from the second node through the communication interface 1101. The sixth indication indicates whether to configure a fifth resource. The fifth resource is for communication of second data. The second data is different from the first data. The sixth indication is carried in the first message or a fourth message different from the first message.

In an embodiment, the processor 1102 is further configured to receive system information from the second node through the communication interface 1101. The system information includes a seventh indication. The seventh indication indicates configuration information of the fifth resource. The fifth resource is for communication of the second data. The second data is different from the first data.

In an embodiment, the processor 1102 is further configured to receive a fifth message at least P times in one periodicity through the communication interface 1101. The fifth message includes a seventh indication. The seventh indication indicates configuration information of the fifth resource. The fifth resource is for communication of the second data. The second data is different from the first data. The one periodicity includes M superframes. M is a positive integer not less than 2. P is a positive integer less than M.

In an embodiment, the processor 1102 is further configured to receive, from the second node through the communication interface 1101, configuration information of a sixth resource or indication information indicating configuration information of a sixth resource. The sixth resource is for communication of the fifth message.

In an embodiment, the processor 1102 is further configured to receive, from the second node through the communication interface 1101, first quantity information or indication information of first quantity information. The first quantity information indicates the quantity M of superframes included in the one periodicity.

In an embodiment, the processor 1102 is further configured to receive, from the second node through the communication interface 1101, second quantity information or indication information of second quantity information. The second quantity information indicates the quantity P of times of sending the fifth message in the one periodicity.

In an embodiment, the system control information includes at least one of the following: acknowledgment/negative acknowledgment feedback information, broadcast information, system information, physical layer control information, higher layer control information, access request information, scheduling request information, and channel feedback information; and/or the system control signal includes at least one of the following: a synchronization signal, a demodulation reference signal, a phase tracking reference signal, a positioning reference signal or a channel status information reference signal, an access request signal, and a scheduling request signal.

It may be understood that the memory in FIG. 11 of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the system and method described in this specification includes but is not limited to these and any other proper types of memories.

Based on the foregoing embodiments, an embodiment of this application further provides a computer program. When the computer program runs on a computer, the computer is enabled to perform the resource scheduling method provided in embodiments shown in FIG. 4 and FIG. 6 to FIG. 9.

Based on the foregoing embodiments, an embodiment of this application further provides a computer-readable storage medium. The computer-readable storage medium stores a computer program. When the computer program is executed by a computer, the computer is enabled to perform the resource scheduling method provided in embodiments shown in FIG. 4 and FIG. 6 to FIG. 9. The storage medium may be any available medium accessible by the computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can be for carrying or storing expected program code in a form of instructions or a data structure and can be accessed by the computer.

Based on the foregoing embodiments, an embodiment of this application further provides a chip. The chip is configured to read a computer program stored in a memory, to implement the resource scheduling method provided in embodiments shown in FIG. 4 and FIG. 6 to FIG. 9.

Based on the foregoing embodiments, an embodiment of this application provides a chip system. The chip system includes a processor, and the processor is configured to support a computer apparatus in implementing the resource scheduling method provided in embodiments shown in FIG. 4 and FIG. 6 to FIG. 9. In an embodiment, the chip system further includes a memory. The memory is configured to store a program and data that are necessary for the computer apparatus. The chip system may include a chip, or may include a chip and another discrete device.

Based on the foregoing embodiments, an embodiment of this application further provides a terminal device. The terminal device includes the communication apparatus shown in FIG. 10 or FIG. 11. The terminal device may be any one of an intelligent manufacturing device, an intelligent transportation device, an intelligent wearable device, and a smart home device.

One of ordinary skilled in the art should understand that embodiments of this application may be provided as a method, a system, or a computer program product. Therefore, this application may use a form of hardware only embodiments, software only embodiments, or embodiments with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer-readable memory that can instruct a computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may alternatively be loaded onto the computer or the another programmable data processing device, so that a series of operations are performed on the computer or the another programmable device, to generate computer-implemented processing. Therefore, the instructions executed on the computer or the another programmable device provide steps for implementing a function in one or more processes in the flowcharts and/or in one or more blocks in the block diagrams.

Apparently, one of ordinary skilled in the art can make various modifications and variations to this application without departing from the scope of this application. This application is intended to cover these modifications and variations of this application provided that they fall within the scope of the claims of this application and an equivalent technology thereof.

The invention claimed is:

1. A communication apparatus, comprising:

a processor; and a memory coupled to the processor to store instructions, which when executed by the processor, cause the apparatus to perform operations, the operations comprising:

sending a first message to a first node, wherein the first message comprises a first indication indicating configuration information of a first resource, wherein the first resource is for communication of system control information and a system control signal, and wherein before receiving the system control signal, the first node learns in advance a sequence corresponding to the system control signal, and after receiving the system control signal, the first node performs processing corresponding to the system control signal; and communicating first data with the first node by using a second resource, wherein the second resource does not overlap the first resource.

2. The apparatus according to claim 1, wherein the first message further comprises a second indication indicating configuration information of a third resource, wherein the third resource comprises the second resource; and the first indication comprises a third indication and/or a fourth indication, wherein the third indication indicates whether the third resource overlaps the first resource, wherein the fourth indication indicates time domain symbol information of a first overlapping resource between the third resource and the first resource.

3. The apparatus according to claim 2, wherein the operations further comprises:

sending a second message comprising the fourth indication, wherein the second message is different from the first message.

4. The apparatus according to claim 2, wherein the third resource comprises N time domain resource units, and N is a positive integer; and the fourth indication comprises total quantity information of time domain symbols of the first overlapping resource in the N time domain resource units; or the fourth indication comprises quantity information of a time domain symbol of the first overlapping resource in each of the N time domain resource units, wherein quantity information of time domain symbols of the first overlapping resource in any two of the N time domain resource units is the same or different; or the fourth indication comprises at least one piece of first quantity information, and a quantity of at least one time domain resource unit corresponding to each piece of first quantity information in the N time domain resource units, wherein quantity information of a time domain symbol of the first overlapping resource in each of the at least one time domain resource unit corresponding to any piece of first quantity information is the first quantity information.

5. The apparatus according to claim 1, wherein the operations further comprises:

sending a fifth indication indicating configuration information of a fourth resource that belongs to another communication domain, wherein the another communication domain is different from a communication domain managed by a second node, and wherein the second node is a communication node sending the first message; and the fifth indication is carried in the first message or a third message different from the first message.

6. The apparatus according to claim 1, wherein the operations further comprises:

sending a sixth indication indicating whether to configure a fifth resource, wherein the fifth resource is for communication of second data, and wherein the second data is different from the first data; and the sixth indication is carried in the first message or a fourth message different from the first message.

7. The apparatus according to claim 1, wherein the operations further comprises:

sending system information comprising a seventh indication indicating configuration information of the fifth resource, wherein the fifth resource is for communication of the second data, and wherein the second data is different from the first data.

8. The apparatus according to claim 1, wherein the operations further comprises:

sending a fifth message at least P times in one periodicity, wherein the fifth message comprises a seventh indication indicating configuration information of the fifth resource, wherein the fifth resource is for communication of the second data, and wherein the second data is different from the first data; and the one periodicity comprises M superframes, M is a positive integer not less than 2, and P is a positive integer less than M.

9. The apparatus according to claim 1, wherein the operations further comprises:

sending configuration information of a sixth resource or indication information indicating configuration information of the sixth resource, wherein the sixth resource is for communication of the fifth message.

10. A communication apparatus operating as a first node, comprising:

a processor; and a memory coupled to the processor to store instructions, which when executed by the processor, cause the apparatus to perform operations, the operations comprising:

receiving a first message from a second node, wherein the first message comprises a first indication indicating configuration information of a first resource, wherein the first resource is for communication of system control information and a system control signal, and wherein before receiving the system control signal, the first node learns in advance a sequence corresponding to the system control signal, and after receiving the system control signal, the first node performs processing corresponding to the system control signal; and performing communication of first data by using a second resource, wherein the second resource does not overlap the first resource.

11. The apparatus according to claim 10, wherein the first message further comprises a second indication, the second indication indicates configuration information of a third resource, and the third resource comprises the second resource; and the first indication comprises a third indication and/or a fourth indication, wherein the third indication indicates whether the third resource overlaps the first resource, wherein the fourth indication indicates time domain symbol information of a first overlapping resource between the third resource and the first resource.

12. The apparatus according to claim 11, wherein the operations further comprises:

receiving a second message from the second node comprising the fourth indication, wherein the second message is different from the first message.

13. The apparatus according to claim 11, wherein the third resource comprises N time domain resource units, and N is a positive integer; and the fourth indication is total quantity information of time domain symbols of the first overlapping resource in the N time domain resource units; or the fourth indication is quantity information of a time domain symbol of the first overlapping resource in each of the N time domain resource units, wherein quantity information of time domain symbols of the first overlapping resource in any two of the N time domain resource units is the same or different; or the fourth indication comprises at least one piece of first quantity information, and a quantity of at least one time domain resource unit corresponding to each piece of first quantity information in the N time domain resource units, wherein quantity information of a time domain symbol of the first overlapping resource in each of the at least one time domain resource unit corresponding to any piece of first quantity information is the first quantity information.

14. The apparatus according to claim 11, wherein the operations further comprises:

determining the second resource based on the first indication and the second indication.

15. The apparatus according to claim 10, wherein the operations further comprises:

receiving a fifth indication from the second node, wherein the fifth indication indicates configuration information of a fourth resource that belongs to another communication domain different from a communication domain managed by the second node, wherein the second node is a communication node sending the first message; and the fifth indication is carried in the first message or a third message different from the first message.

16. The apparatus according to claim 10, wherein the operations further comprises:

receiving a sixth indication from the second node, wherein the sixth indication indicates whether to configure a fifth resource, wherein the fifth resource is for communication of second data, wherein the second data is different from the first data; and the sixth indication is carried in the first message or a fourth message different from the first message.

17. The apparatus according to claim 10, wherein the operations further comprises:

receiving system information from the second node, wherein the system information comprises a seventh indication indicating configuration information of the fifth resource, wherein the fifth resource is for communication of the second data, and wherein the second data is different from the first data.

18. The apparatus according to claim 10, wherein the operations further comprises:

receiving a fifth message at least P times in one periodicity, wherein the fifth message comprises a seventh indication indicating configuration information of the fifth resource, wherein the fifth resource is for communication of the second data, wherein the second data is different from the first data; and the one periodicity comprises M superframes, M is a positive integer not less than 2, and P is a positive integer less than M.

19. A resource scheduling method, comprising:

sending a first message to a first node, wherein the first message comprises a first indication indicating configuration information of a first resource, wherein the first resource is for communication of system control information and a system control signal, and wherein before receiving the system control signal, the first node learns in advance a sequence corresponding to the system control signal, and after receiving the system control signal, the first node performs processing corresponding to the system control signal; and communicating first data with the first node by using a second resource, wherein the second resource does not overlap the first resource.

20. A resource scheduling method, the method further comprising:

receiving a first message from a second node, wherein the first message comprises a first indication indicating configuration information of a first resource, wherein the first resource is for communication of system control information and/or a system control signal; and performing communication of first data by using a second resource, wherein the second resource does not overlap the first resource.

* * * * *